(12) United States Patent
Friedman et al.

(10) Patent No.: US 12,411,345 B1
(45) Date of Patent: Sep. 9, 2025

(54) VECTOR SCANNING AUGMENT REALITY

(71) Applicant: Meta Platforms Technologies, LLC, Menlo Park, CA (US)

(72) Inventors: Brandon Michael Hellman Friedman, Redmond, WA (US); Brian Wheelwright, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/771,872

(22) Filed: Jul. 12, 2024

(51) Int. Cl.
*G09G 5/00* (2006.01)
*G02B 27/01* (2006.01)

(52) U.S. Cl.
CPC .................... *G02B 27/0172* (2013.01)

(58) Field of Classification Search
CPC ...... G09G 5/00; G02B 27/0172; G02B 27/28; G02B 27/01; A61B 3/0008; A61B 3/022; A61B 3/0025; A61B 3/0003; A61B 3/005
See application file for complete search history.

(56) References Cited

U.S. PATENT DOCUMENTS

| | | | |
|---|---|---|---|
| 8,330,673 B2 | 12/2012 | Cui et al. | |
| 8,698,713 B2 | 4/2014 | Hajjar et al. | |
| 9,958,684 B1 | 5/2018 | Robbins | |
| 10,345,593 B2* | 7/2019 | Samec | A61B 3/12 |
| 10,642,045 B2 | 5/2020 | Wall et al. | |
| 10,877,281 B2* | 12/2020 | Robbins | G02B 27/283 |
| 2017/0017083 A1* | 1/2017 | Samec | G02B 27/0172 |
| 2020/0110268 A1* | 4/2020 | Robbins | G02B 27/0179 |

OTHER PUBLICATIONS

Li J., et al., "High-Resolution Dynamic Inversion Imaging with Motion-Aberrations-Free using Optical Flow Learning Networks," Scientific Reports, Aug. 5, 2019, 12 pages.
Liu J., et al., "Image Edge Recognition of Virtual Reality Scene Based on Multi-Operator Dynamic Weight Detection," IEEE Access, Jun. 2020, vol. 8, pp. 111289-111302.

* cited by examiner

*Primary Examiner* — Olga V Merkoulova
(74) *Attorney, Agent, or Firm* — Greenberg Traurig, LLP

(57) ABSTRACT

A method of displaying images by vector scanning in a head-mounted display includes determining, based on content of an image to be displayed by the head-mounted display, a vector scanning pattern for displaying the image, the vector scanning pattern including a plurality of scan lines and one or more transition lines connecting the plurality of scan lines, at least one transition line of the one or more transition lines including a curved section (or loop); generating control signals for controlling a scanner to steer, according to the vector scanning pattern, a light beam emitted by a light source towards a waveguide display of the head-mounted display; and generating modulation signals for modulating the light source such that the light beam is turned on when the scanner operates according to the plurality of scan lines and is turned off when the scanner operates according to the one or more transition lines.

20 Claims, 17 Drawing Sheets

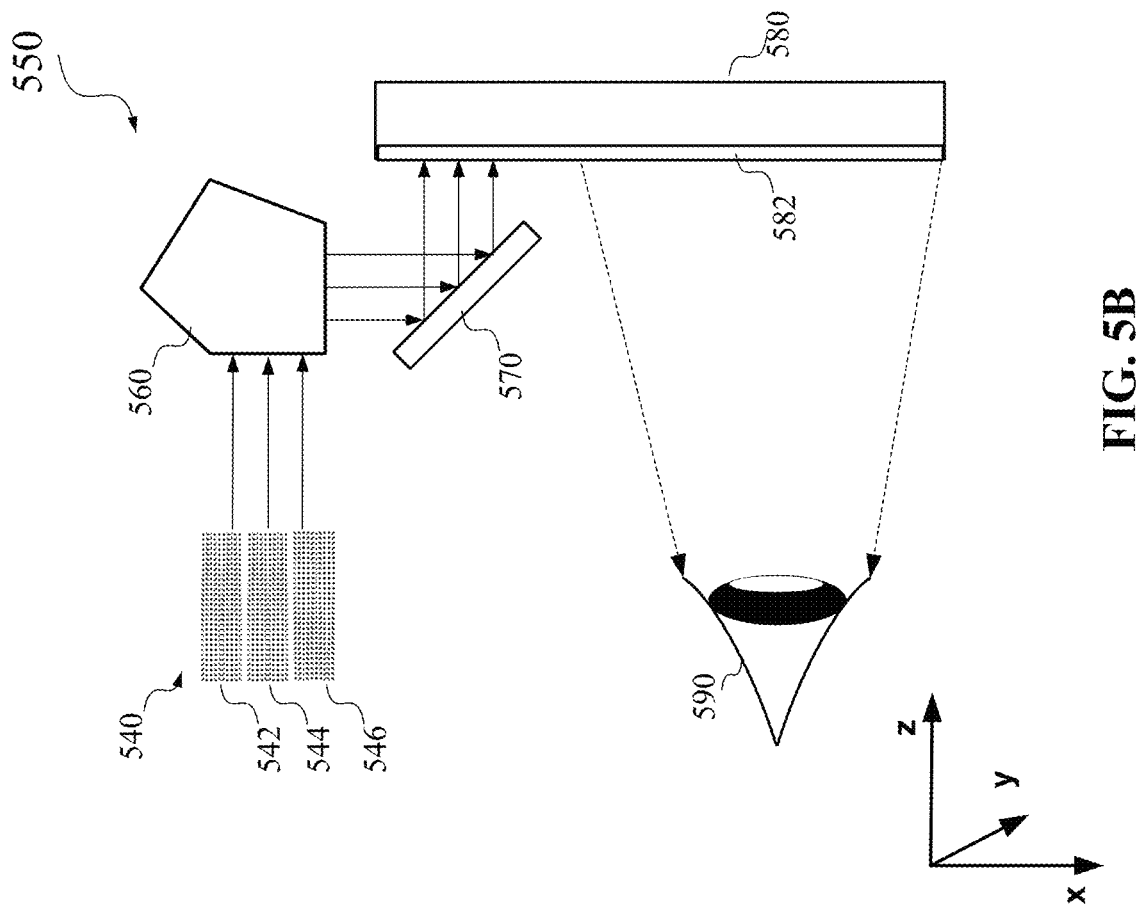
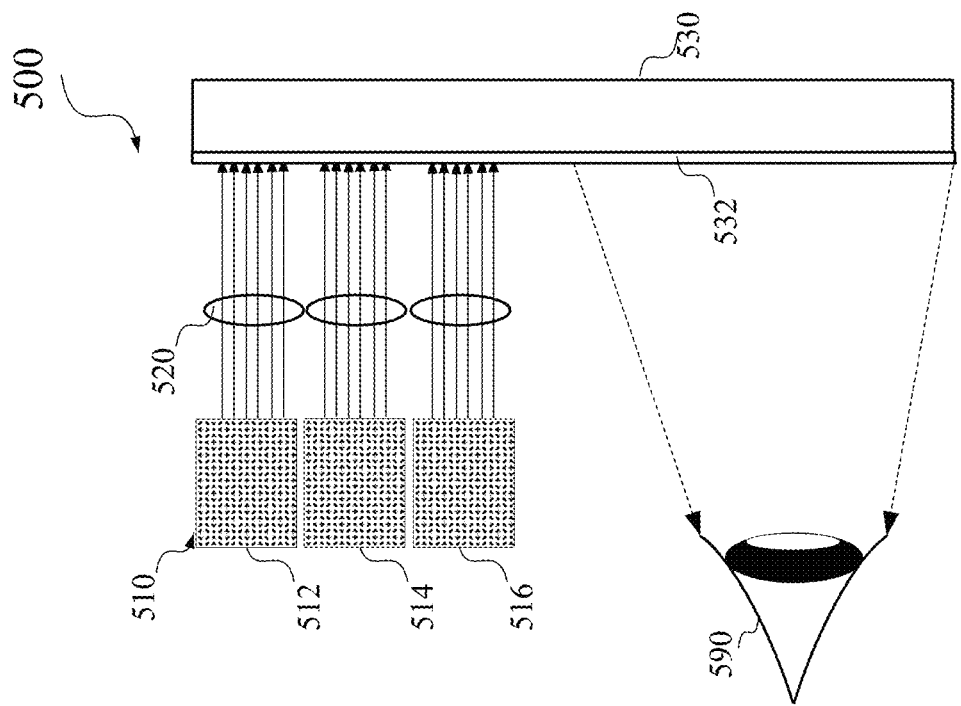
FIG. 5B
FIG. 5A

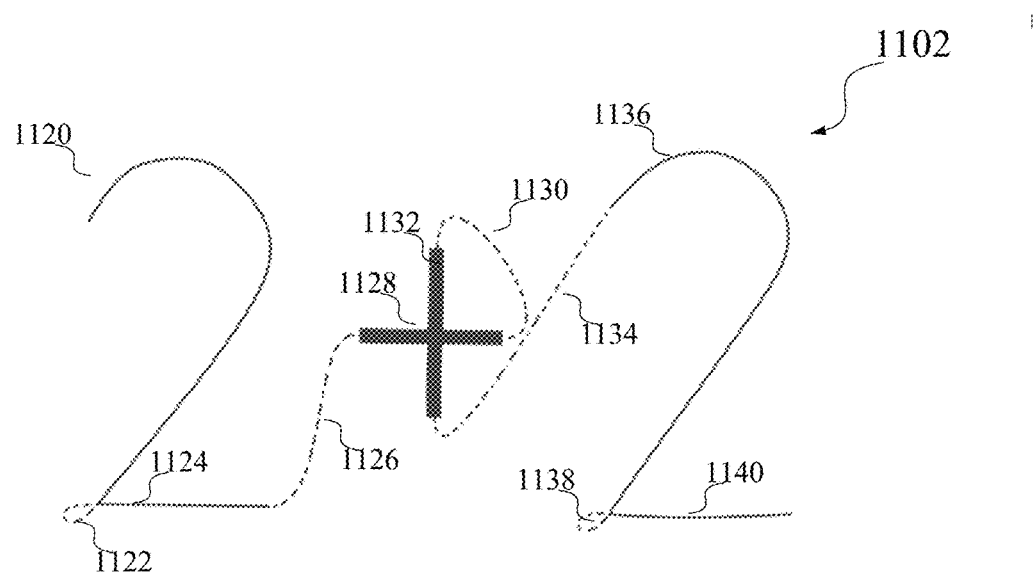
FIG. 11B
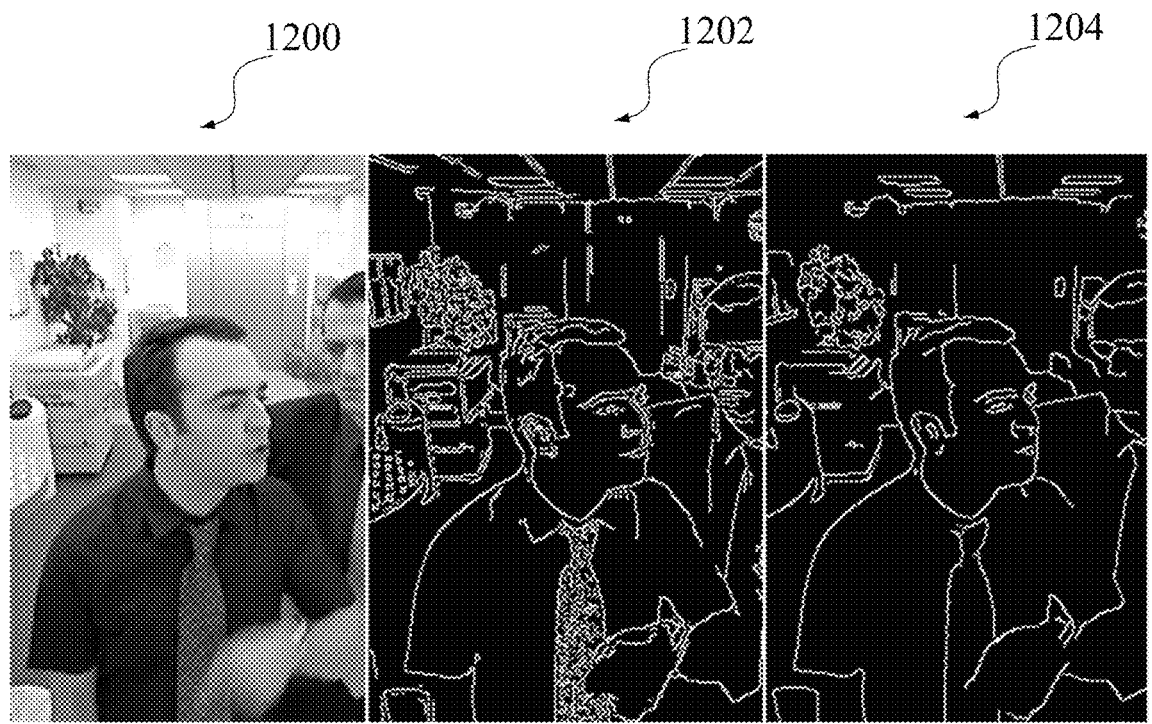
FIG. 12A  FIG. 12B  FIG. 12C

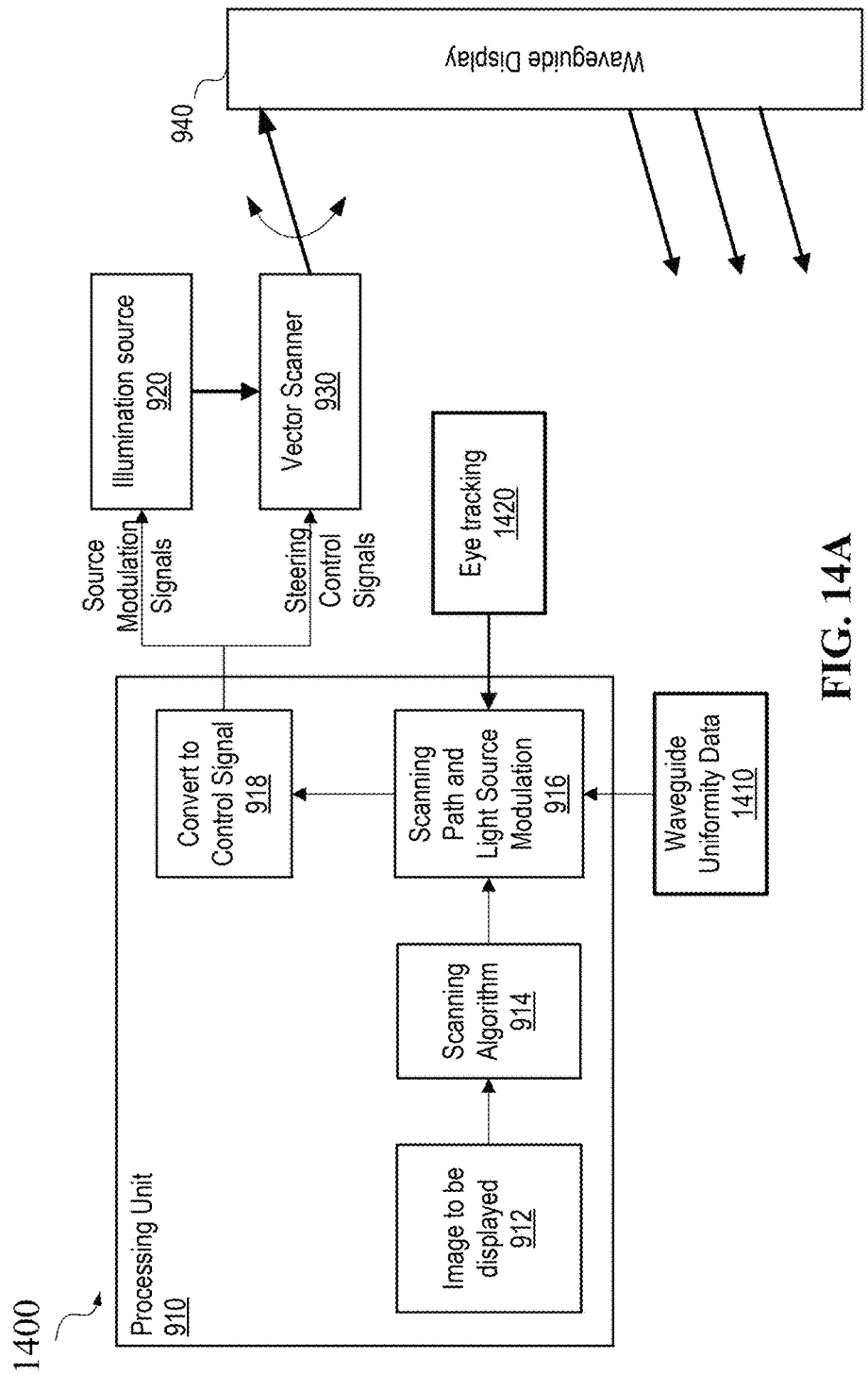
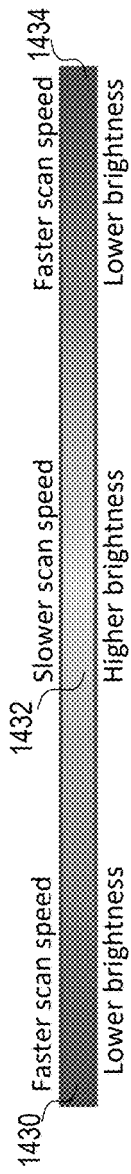
FIG. 14A
FIG. 14B

VECTOR SCANNING AUGMENT REALITY

BACKGROUND

An artificial reality system, such as a head-mounted display (HMD) or heads-up display (HUD) system, generally includes a head-mounted display system in the form of a headset or a pair of glasses and configured to present content to a user via an electronic or optic display within, for example, about 10-20 mm in front of the user's eyes. The head-mounted display system may display virtual objects or combine images of real objects with virtual objects, as in virtual reality (VR), augmented reality (AR), or mixed reality (MR) applications. A near-eye display generally includes an optical system configured to form an image of a computer-generated image on an image plane. The optical system of the near-eye display may relay the image generated by an image source (e.g., a display panel) to create a virtual image that appears to be away from the image source and further than just a few centimeters away from the user's eyes.

SUMMARY

This disclosure relates generally to near-eye display. More specifically, and without limitation, techniques disclosed herein relate to vector scanning-based near-eye display. Various inventive embodiments are described herein, including devices, systems, structures, methods, processes, program code, and the like.

According to certain embodiments, a head-mounted display system may include a light source configured to emit a light beam, a scanner configured to steer the light beam, a waveguide display configured to receive the light beam from the scanner and direct the light beam towards an eyebox of the head-mounted display system, one or more processors electrically coupled to the light source and the scanner, and one or more memory devices storing instructions. The instructions, when executed by the one or more processors, cause the one or more processors to perform operations including: determining, based on content of an image, a vector scanning pattern for displaying the image, where the vector scanning pattern includes a plurality of scan lines and one or more transition lines connecting the plurality of scan lines, and where at least one transition line of the one or more transition lines includes a curved section; generating control signals for controlling the scanner to steer the light beam according to the vector scanning pattern; and generating modulation signals for modulating the light source such that the light beam is turned on when the scanner operates according to the plurality of scan lines and is turned off when the scanner operates according to the one or more transition lines.

According to certain embodiments, a processor-implemented method may include determining, based on content of an image to be displayed by a head-mounted display system, a vector scanning pattern for displaying the image, where the vector scanning pattern includes a plurality of scan lines and one or more transition lines connecting the plurality of scan lines, and where at least one transition line of the one or more transition lines includes a curved section; generating control signals for controlling a scanner to steer, according to the vector scanning pattern, a light beam emitted by a light source towards a waveguide display of the head-mounted display system; and generating modulation signals for modulating the light source such that the light beam is turned on when the scanner operates according to the plurality of scan lines and is turned off when the scanner operates according to the one or more transition lines.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 5A illustrates an example of a near-eye display device including a waveguide display.

FIG. 5B illustrates an example of a near-eye display device including a waveguide display according to certain embodiments.

FIG. 11B illustrates an example of displaying an image by vector scanning using a light beam having a variable beam width according to certain embodiments.

FIGS. 12A-12C illustrate an example of a method of displaying an image by vector scanning according to certain embodiments.

FIG. 14A illustrates an example of a vector scanning-based head-mounted display system capable of non-uniformity correction according to certain embodiments.

FIG. 14B illustrates an example of non-uniformity correction using the vector scanning-based head-mounted display system of FIG. 14A according to certain embodiments.

Figure 1:
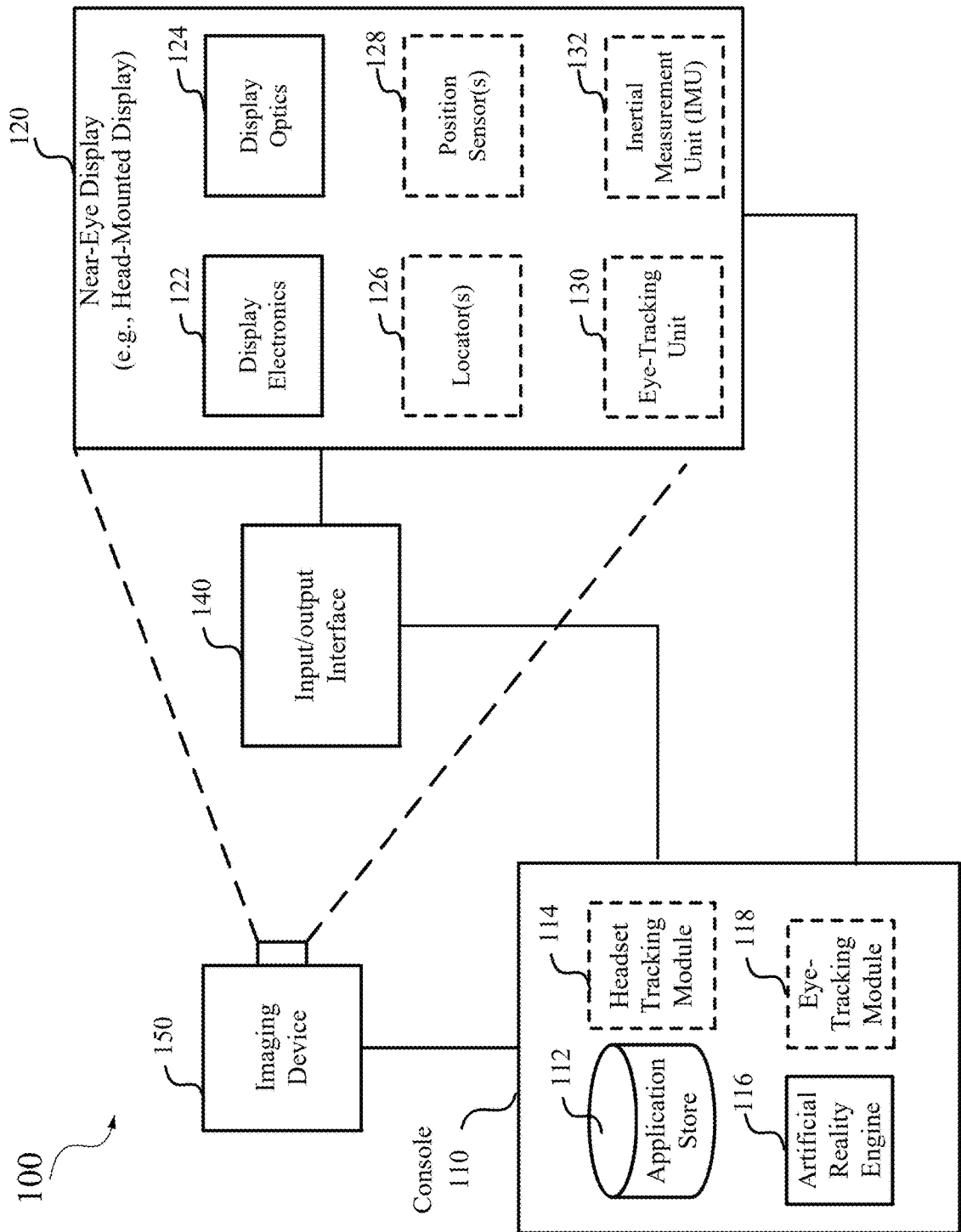
FIG. 1 is a simplified block diagram of an example of an artificial reality system environment including a near-eye display.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to near-eye display. More specifically, and without limitation, techniques disclosed herein relate to vector scanning-based near-eye display. Various inventive embodiments are described herein, including devices, systems, structures, methods, processes, program code, and the like.

Augmented reality (AR), virtual reality (VR), mixed reality (MR), and other artificial reality applications may use head-mounted display (HMD) systems (which may also be referred to as near-eye display systems) to present images of virtual objects and/or real objects to the user's eyes. A head-mounted display system generally includes an image source (e.g., a display panel) that is near the user's eye and can generate images to be viewed by the user. The head-mounted display system may also include an optical system configured to relay the images generated by the image source to create virtual images that appear to be away from the image source (e.g., further than just a few centimeters away from the user's eyes). The image source of the head-mounted display system may include, for example, a liquid crystal display (LCD), an organic light emitting diode (OLED) display, a micro-OLED display, an inorganic light emitting diode (ILED) display, a micro light emitting diode (micro-LED) display, an active-matrix OLED display (AMOLED), a transparent OLED display (TOLED), and the like. The optical system of the head-mounted display system may include, for example, a lens (e.g., pancake lens) and/or an optical combiner such as a waveguide combiner, a partial reflector combiner, a prism birdbath combiner, a free-space birdbath combiner, and the like.

It is generally desirable that the head-mounted display system has a small size, a low weight, a large field of view, a large eye box, a high power efficiency, a high image brightness, a high resolution, a high refresh rate, a low cost, a long battery life, and a long lifetime. To achieve such performance, it is generally desirable that the image source (e.g., a display panel) of the head-mounted display system has a higher resolution, a large color gamut, a large field of view (FOV), a high brightness, and better image quality, in order to improve the immersive experience of using the head-mounted display system. For a battery-powered head-mounted display system, it may also be desirable that the light source or image source has a higher power efficiency to improve the battery life of the system. Image sources such as LCD displays, OLED displays, micro-OLED displays, ILED displays, QLED displays, micro-LED displays, AMOLED displays, TOLED displays, and the like, may have limited resolution, brightness, field of view, and power efficiency, and/or may have high costs in order to achieve better resolution, brightness, field of view, and power efficiency. For example, to achieve a high resolution, a large number (e.g., millions) of light emitters may be used, and the displays may be relatively large due to finite sizes of the light emitters and may have high power consumption due to the large number of light emitters. Large display optics may need to be used for large displays. Thus, the head-mounted display system may have a large form factor and a high weight.

Light beam scanning-based head-mounted display systems may display images to users by, for example, steering one or more light beams according to a scanning pattern. The light beams can include laser beams that may have high intensities and high spectral purity. The light beams can be steered over a large angular range to provide a large field of view. Therefore, light beam scanning-based head-mounted display systems may be able to achieve the desired resolution, brightness, field of view, power efficiency, and the like, with a relatively low system complexity and cost. In some examples, two-dimensional (2D) scanning may be used to provide a 2D FOV without using a pixelated light source or image source. For example, in some 2D scanning-based head-mounted display systems, a collimated laser beam may be steered toward different directions across the field of view to display an image. Each pixel of the image may be displayed by steering the laser beam towards a respective direction. In this way, pixels of the image may be displayed sequentially (pixel-by-pixel) by scanning the laser beam. Sequential pixel displaying can be performed at fast speeds to achieve sufficiently high frame rates. For instance, to display images with a resolution of 1000×1000 pixels (1,000,000 pixels) at a frame rate of 60 Hz, each pixel must be displayed within about 16.67 ns (1/60/1,000,000) on average.

Some 2D scanning systems may use "raster" or "Lissajous" scanning patterns to direct the laser beam toward the respective direction for each pixel. Some 2D scanning systems may employ micro-electro-mechanical system (MEMS) mirrors to steer light beams by rotating the mirrors around one or two axes. The 2D scanning may be achieved using either dual-axis MEMS mirrors or cascaded single-axis MEMS mirrors. A resonant axis, or two resonant axes in the case of Lissajous scanning, may be used to achieve sufficiently high scanning speeds using mechanical rotation resonance in MEMS mirrors. Some other beam steering devices may include, for example, grating light valves, phased arrays, and the like. These 2D scanning systems may be pixelated scanning systems, where the scanning path may need to cover every pixel, whether or not the pixel needs to be on in a specific image frame. Therefore, the laser beam dwell time at each pixel may be constant, whether the displayed image has a low or high fill factor (e.g., the ratio between the number of pixels that are on and the total number of pixels).

In some of these pixelated light beam scanning-based head-mounted display systems, high-speed laser modulation may be used to generate short-pulsed laser beams for respective pixels to project arbitrary content. A bright pixel may be displayed to the user when the laser emits a short laser pulse while the scanner points to a corresponding direction for the pixel. The brightness of each bright pixel may be limited due to the short dwell time and short laser pulse for each pixel (e.g., less than about 20 ns or less than about 10 ns), whether the displayed image has a low or high fill factor for bright pixels. To achieve a high brightness, the short-pulsed laser beam may need to have high peak and average optical power. In general, higher electrical driving power may be needed to achieve higher optical power (or brightness) in these short-pulsed laser sources. In addition, the optical systems of the light beam scanning-based head-mounted display systems may need to have high damage thresholds in order to handle the high-power short-pulsed laser beams without being damaged. Therefore, the brightness of the displayed image may be limited by, for example, the driving power and/or the damage threshold of the light beam scanning-based head-mounted display system.

In some augmented reality head-mounted display systems, including some light beam scanning-based head-mounted display systems, a waveguide may be used as an optical combiner to, for example, provide optical see through capability and pupil replication/expansion capability (e.g., to provide a large eyebox). But some waveguide-based head-mounted display systems may have low overall optical efficiencies (e.g., the efficiency on a path from the light source, through an input coupler, waveguide, and output coupler, to the eyebox), such as about 1% or a few percents, due to, for example, low efficiencies of the input and output couplers. Due to the lower optical efficiencies of waveguide-based head-mounted display systems, the light sources may need to have higher output power in order to achieve the desired brightness in the images displayed to the eyebox of the waveguide-based head-mounted display systems. To achieve the higher output power, the waveguide-based head-mounted display systems may need to have higher electrical driving power and higher laser damage thresholds as described above.

In many artificial reality applications, such as many augmented reality displays, the images to be displayed may have low fill factors, where the content may be displayed using only a small portion of the available pixels for each image frame. However, the "raster" or "Lissajous" scanning techniques may still need to scan to all pixel directions, and the light beam dwell time for each pixel may be constant and short, because the scanning path is fixed and is content independent. Therefore, to achieve the desired image brightness, the short-pulsed laser beams may need to have high peak power, and thus the head-mounted display systems may need to have high electrical peak power and high laser damage thresholds. In addition, scanning to corresponding directions for all pixel regardless of the content to be displayed may also consume more electrical power for driving the scanning elements (e.g., MEMS mirrors) of the head-mounted display systems.

According to certain embodiments disclosed herein, vector scanning techniques may be used in some head-mounted display systems (e.g., some augmented reality or mixed reality display systems that include waveguide displays) to steer a light beam according to a scan path that may be content dependent, where the light beam may not need to be steered into all directions for displaying most 2D images. In vector scanning, the content to be displayed may be defined using coordinates and lines, rather than pixels in a pixel grid, where the light beam may function as a paintbrush and may be steered by a beam steering device according to a scan path to paint an image. The beam steering device may be controlled to steer light according to an arbitrary content-dependent scan path, rather than according to a fixed scan path as in "raster" scanning or "Lissajous" scanning. The scan path may be determined based on the content to be displayed. To display different content, different vector scan paths may be used. The color, brightness, pulse duration, and the width of the light beam may be controlled during the scanning process to generate the desired display content.

In vector scanning techniques disclosed herein, the scan path may be optimized to reduce the overall length of the scan path. The light beam may not need to be turned on and off for each pixel direction, and can remain on when the light beam is steered along a straight or curved line. The light source can be turned off and the steering can be at a faster speed during transitions between content of the image, thereby reducing power consumption and increasing the dwell time for content to be displayed. Therefore, compared with "raster" scanning or "Lissajous" scanning techniques, vector scanning techniques disclosed herein may display an image using a content-dependent scan path that may minimize the scan path length and reduce the power used for the scanning. Because the scan path length may be reduced and the light beam may not need to be steered into all directions for displaying a 2D image, the effective dwell time of the light beam at each steering direction can be increased to increase the brightness of each image frame. Therefore, to achieve the desired brightness of the displayed image, the optical output power of the light source can be reduced. For example, to display a low-fill image that includes only one line at a frame rate of 60 Hz and an effective resolution of 1000×1000 pixels, the dwell time at each scanning direction can be about 16.67 µs (1/60/1000), rather than about 16.67 ns as in raster scanning or "Lissajous" scanning. As such, with the same optical output power of the light beam, the brightness of the content displayed using vector scanning can be about 1000 times of that of the content displayed using raster scanning or "Lissajous" scanning. Alternatively, compared with raster scanning or "Lissajous" scanning, the same or higher brightness can be achieved by vector scanning using a light beam with a much lower power.

Furthermore, in some examples, the scan path can be modified to include curves or loops (rather than sharp turns) in the scan path. Using curves or loops (rather than sharp turns) may reduce the electrical power used for steering the light beam. For example, in MEMS vector scanner, there may be a relationship between the torque needed to actuate (e.g., rotate) the MEMS mirror and the drive power. The scan path may be optimized to maintain sharp corners in the content while reducing the electrical power used for steering the light beam, for example, by adding a loop at a sharp corner on the scan path and turning off the illumination source during the steering according to the loop. Using curves or loops (rather than sharp turns) in the scan path can reduce the torque for actuating the MEMS mirror, and thus may reduce the electrical power for actuating the MEMS mirror. Using curves or loops at sharp corners may also enable the scanner to scan at a higher speed at the sharp corners.

In addition, in some head-mounted display systems disclosed herein, the light beam can be controlled to have different beam widths during the scanning process, such that the lines of an image generated in a single scan path may have different thicknesses. Furthermore, the brightness of the generated image may be controlled during the scanning process, for example, by controlling the scanning speed or the dwell time at each scanning direction, to pre-compensate brightness nonuniformity that may otherwise be caused by a waveguide display, thereby improving the brightness uniformity of the image output from the waveguide display to the eyebox. The brightness uniformity correction can be implemented independent of the eye pupil position by improving brightness uniformity across the full eyebox, or can be implemented with eye tracking (e.g., based on the position and/or field of view of the user's eye).

The vector scanning techniques described herein may be used in conjunction with various technologies, such as an artificial reality system. An artificial reality system, such as a head-mounted display (HMD) or heads-up display (HUD) system, generally includes a display configured to present artificial images that depict objects in a virtual environment. The display may present virtual objects or combine images of real objects with virtual objects, as in virtual reality (VR), augmented reality (AR), or mixed reality (MR) applications. For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through). In some AR systems, the artificial images may be presented to users using an LED-based display subsystem.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an antireflective coating, a reflective coating, a filtering coating, or a combination of different optical coatings.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices).

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120.

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. Artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to determine the eye's orientation more accurately.

Figure 2:
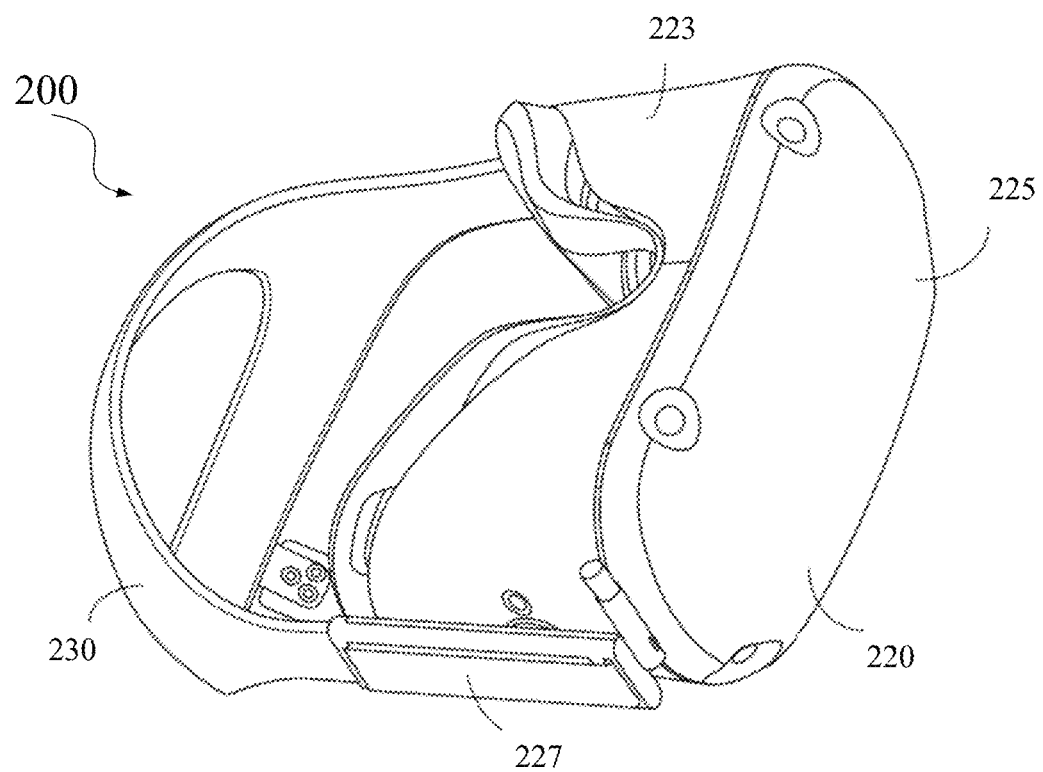
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a pLED display, an AMO-LED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
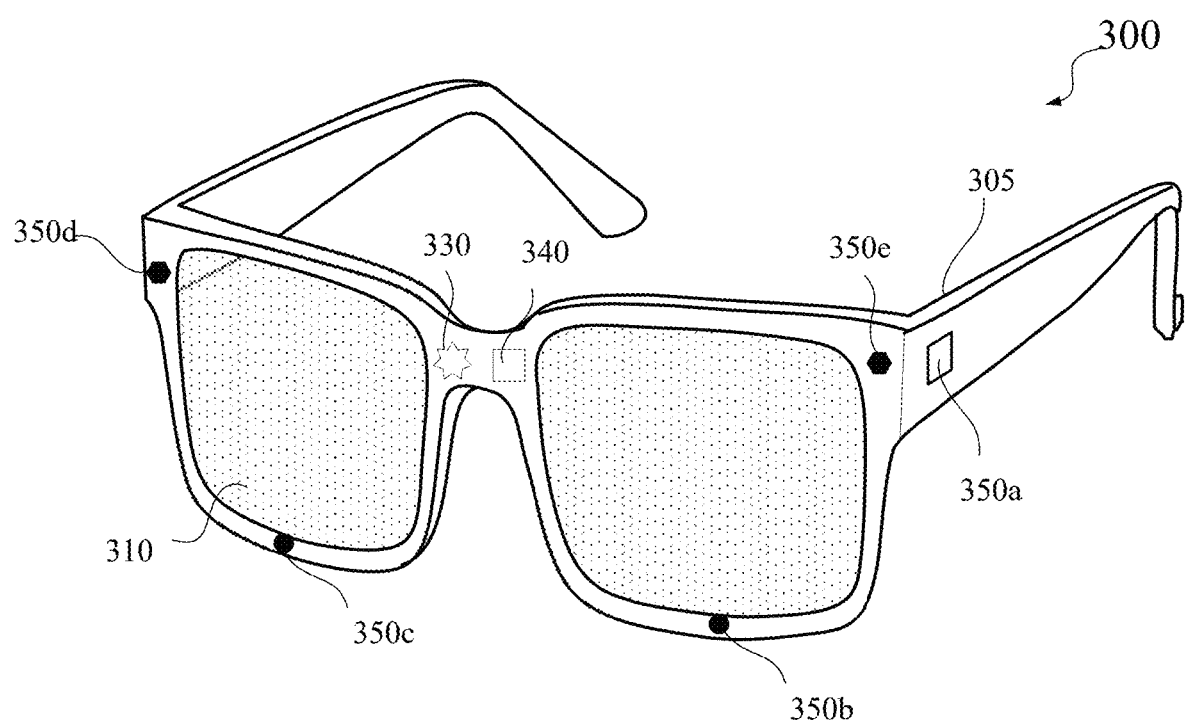
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350*a*, 350*b*, 350*c*, 350*d*, and 350*e* on or within frame 305. In some embodiments, sensors 350*a*-350*e* may include one or more depth sensors, motion sensors, position sensors, inertial sensors, or ambient light sensors. In some embodiments, sensors 350*a*-350*e* may include one or more image sensors configured to generate image data representing different fields of views in different directions. In some embodiments, sensors 350*a*-350*e* may be used as input devices to control or influence the displayed content of near-eye display 300, and/or to provide an interactive VR/AR/MR experience to a user of near-eye display 300. In some embodiments, sensors 350*a*-350*e* may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
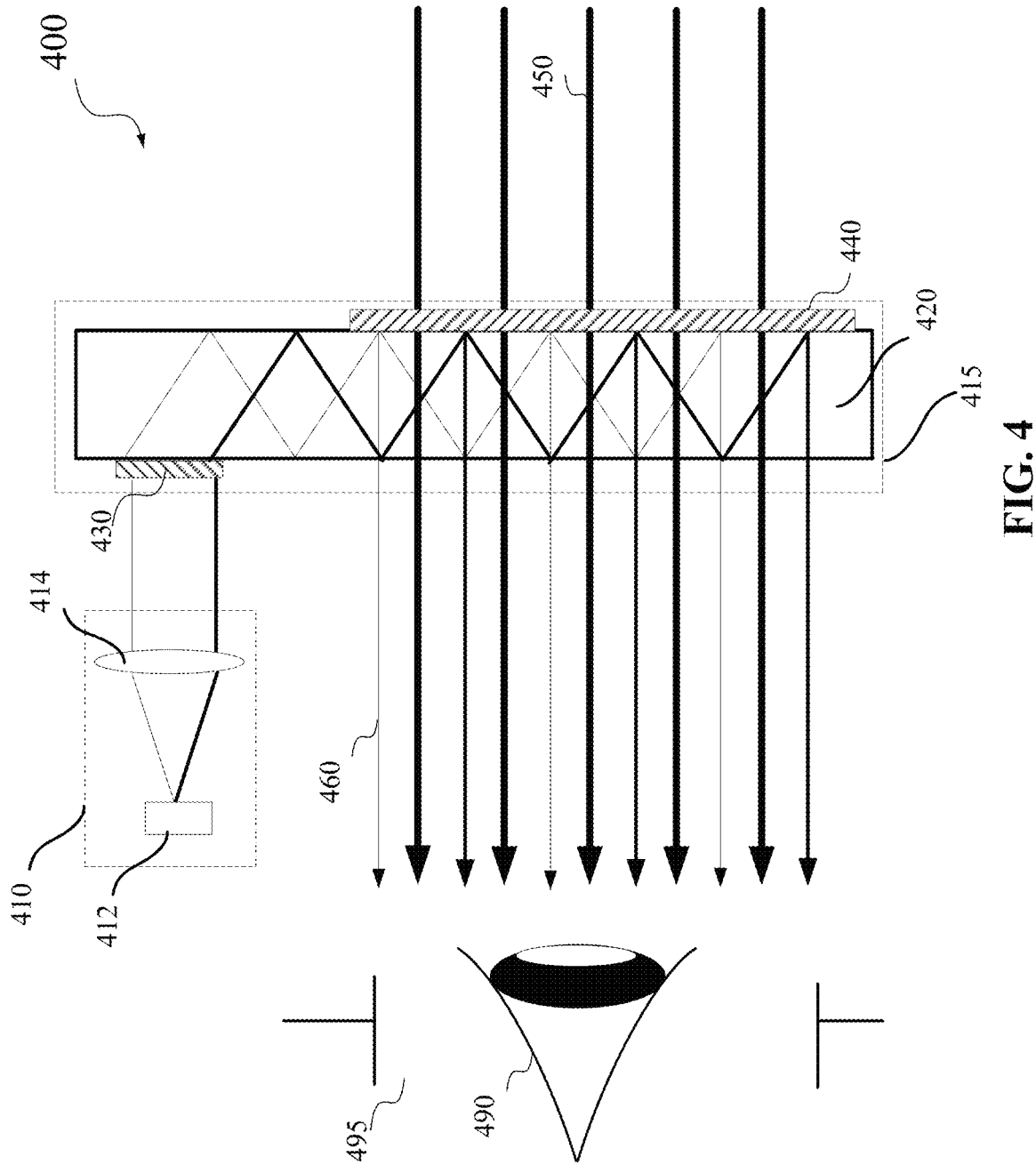
FIG. 4 illustrates an example of an optical see-through augmented reality system including a waveguide display.

FIG. 4 illustrates an example of an optical see-through augmented reality system 400 including a waveguide display according to certain embodiments. Augmented reality system 400 may include a projector 410 and a combiner 415. Projector 410 may include a light source or image source 412 and projector optics 414. In some embodiments, light source or image source 412 may include one or more micro-LED devices described above. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, an LED, and/or a micro-LED described above. In some embodiments, image source 412 may include a plurality of light sources (e.g., an array of micro-LEDs described above), each emitting a monochromatic image light corresponding to a primary color (e.g., red, green, or blue). In some embodiments, image source 412 may include three two-dimensional arrays of micro-LEDs, where each two-dimensional array of micro-LEDs may include micro-LEDs configured to emit light of a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. For example, in some embodiments, image source 412 may include one or more one-dimensional arrays or elongated two-dimensional arrays of micro-LEDs, and projector optics 414 may include one or more one-dimensional scanners (e.g., micro-mirrors or prisms) configured to scan the one-dimensional arrays or elongated two-dimensional arrays of micro-LEDs to generate image frames. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Input coupler 430 may include a volume holographic grating, a diffractive optical element (DOE) (e.g., a surface-relief grating), a slanted surface of substrate 420, or a refractive coupler (e.g., a wedge or a prism). For example, input coupler 430 may include a reflective volume Bragg grating or a transmissive volume Bragg grating. Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440, each configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. The plurality of output couplers 440 may replicate the exit pupil to increase the size of eyebox 495 such that the displayed image is visible in a larger area. As input coupler 430, output couplers 440 may include grating couplers (e.g., volume holographic gratings or surface-relief gratings), other diffraction optical elements (DOEs), prisms, etc. For example, output couplers 440 may include reflective volume Bragg gratings or transmissive volume Bragg gratings. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a very low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 in certain desired directions (i.e., diffraction angles) with little loss. As a result, the user may be able to view combined images of the environment in front of combiner 415 and images of virtual objects projected by projector 410.

FIG. 5A illustrates an example of a near-eye display (NED) device 500 including a waveguide display 530 according to certain embodiments. NED device 500 may be an example of near-eye display 120, augmented reality system 400, or another type of display device. NED device 500 may include a light source 510, projection optics 520, and waveguide display 530. Light source 510 may include multiple panels of light emitters for different colors, such as a panel of red light emitters 512, a panel of green light emitters 514, and a panel of blue light emitters 516. The red light emitters 512 are organized into an array; the green light emitters 514 are organized into an array; and the blue light emitters 516 are organized into an array. The dimensions and pitches of light emitters in light source 510 may be small. For example, each light emitter may have a diameter less than 2 μm (e.g., about 1.2 μm) and the pitch may be less than 2 μm (e.g., about 1.5 μm). As such, the number of light emitters in each red light emitters 512, green light emitters 514, and blue light emitters 516 can be equal to or greater than the number of pixels in a display image, such as 960×720, 1280×720, 1440×1080, 1920×1080, 2160×1080, 2560×1080, or more pixels. Thus, a display image may be generated simultaneously by light source 510. A scanning element may not be used in NED device 500.

Before reaching waveguide display 530, the light emitted by light source 510 may be conditioned by projection optics 520, which may include a lens array. Projection optics 520 may collimate or focus the light emitted by light source 510 to waveguide display 530, which may include a coupler 532 for coupling the light emitted by light source 510 into waveguide display 530. The light coupled into waveguide display 530 may propagate within waveguide display 530 through, for example, total internal reflection as described above with respect to FIG. 4. Coupler 532 may also couple portions of the light propagating within waveguide display 530 out of waveguide display 530 and towards user's eye 590.

FIG. 5B illustrates an example of a near-eye display (NED) device 550 including a waveguide display 580 according to certain embodiments. In some embodiments, NED device 550 may use a scanning mirror 570 to project light from a light source 540 to an image field where a user's eye 590 may be located. NED device 550 may be an example of near-eye display 120, augmented reality system 400, or another type of display device. Light source 540 may include one or more rows or one or more columns of light emitters of different colors, such as multiple rows of red light emitters 542, multiple rows of green light emitters 544, and multiple rows of blue light emitters 546. For example, red light emitters 542, green light emitters 544, and blue light emitters 546 may each include N rows, each row including, for example, 2560 light emitters (pixels). The red light emitters 542 are organized into an array; the green light emitters 544 are organized into an array; and the blue light emitters 546 are organized into an array. In some embodiments, light source 540 may include a single line of light emitters for each color. In some embodiments, light source 540 may include multiple columns of light emitters for each of red, green, and blue colors, where each column may include, for example, 1080 light emitters. In some embodiments, the dimensions and/or pitches of the light emitters in light source 540 may be relatively large (e.g., about 3-5 μm) and thus light source 540 may not include sufficient light emitters for simultaneously generating a full display image. For example, the number of light emitters for a single color may be fewer than the number of pixels (e.g., 2560×1080 pixels) in a display image. The light emitted by light source 540 may be a set of collimated or diverging beams of light.

Before reaching scanning mirror 570, the light emitted by light source 540 may be conditioned by various optical devices, such as collimating lenses or a freeform optical element 560. Freeform optical element 560 may include, for example, a multi-facet prism or another light folding element that may direct the light emitted by light source 540 towards scanning mirror 570, such as changing the propagation direction of the light emitted by light source 540 by, for example, about 900 or larger. In some embodiments, freeform optical element 560 may be rotatable to scan the light. Scanning mirror 570 and/or freeform optical element 560 may reflect and project the light emitted by light source 540 to waveguide display 580, which may include a coupler 582 for coupling the light emitted by light source 540 into waveguide display 580. The light coupled into waveguide display 580 may propagate within waveguide display 580 through, for example, total internal reflection as described above with respect to FIG. 4. Coupler 582 may also couple portions of the light propagating within waveguide display 580 out of waveguide display 580 and towards user's eye 590.

Scanning mirror 570 may include a microelectromechanical system (MEMS) mirror or any other suitable mirrors. Scanning mirror 570 may rotate to scan in one or two dimensions. As scanning mirror 570 rotates, the light emitted by light source 540 may be directed to a different area of waveguide display 580 such that a full display image may be projected onto waveguide display 580 and directed to user's eye 590 by waveguide display 580 in each scanning cycle. For example, in embodiments where light source 540 includes light emitters for all pixels in one or more rows or columns, scanning mirror 570 may be rotated in the column or row direction (e.g., x or y direction) to scan an image. In embodiments where light source 540 includes light emitters for some but not all pixels in one or more rows or columns, scanning mirror 570 may be rotated in both the row and column directions (e.g., both x and y directions) to project a display image (e.g., using a raster-type scanning pattern).

NED device 550 may operate in predefined display periods. A display period (e.g., display cycle) may refer to a duration of time in which a full image is scanned or projected. For example, a display period may be a reciprocal of the desired frame rate. In NED device 550 that includes scanning mirror 570, the display period may also be referred to as a scanning period or scanning cycle. The light generation by light source 540 may be synchronized with the rotation of scanning mirror 570. For example, each scanning cycle may include multiple scanning steps, where light source 540 may generate a different light pattern in each respective scanning step.

In each scanning cycle, as scanning mirror 570 rotates, a display image may be projected onto waveguide display 580 and user's eye 590. The actual color value and light intensity (e.g., brightness) of a given pixel location of the display image may be an average of the light beams of the three colors (e.g., red, green, and blue) illuminating the pixel location during the scanning period. After completing a scanning period, scanning mirror 570 may revert back to the initial position to project light for the first few rows of the next display image or may rotate in a reverse direction or scan pattern to project light for the next display image, where a new set of driving signals may be fed to light source 540. The same process may be repeated as scanning mirror 570 rotates in each scanning cycle. As such, different images may be projected to user's eye 590 in different scanning cycles.

Figure 6:
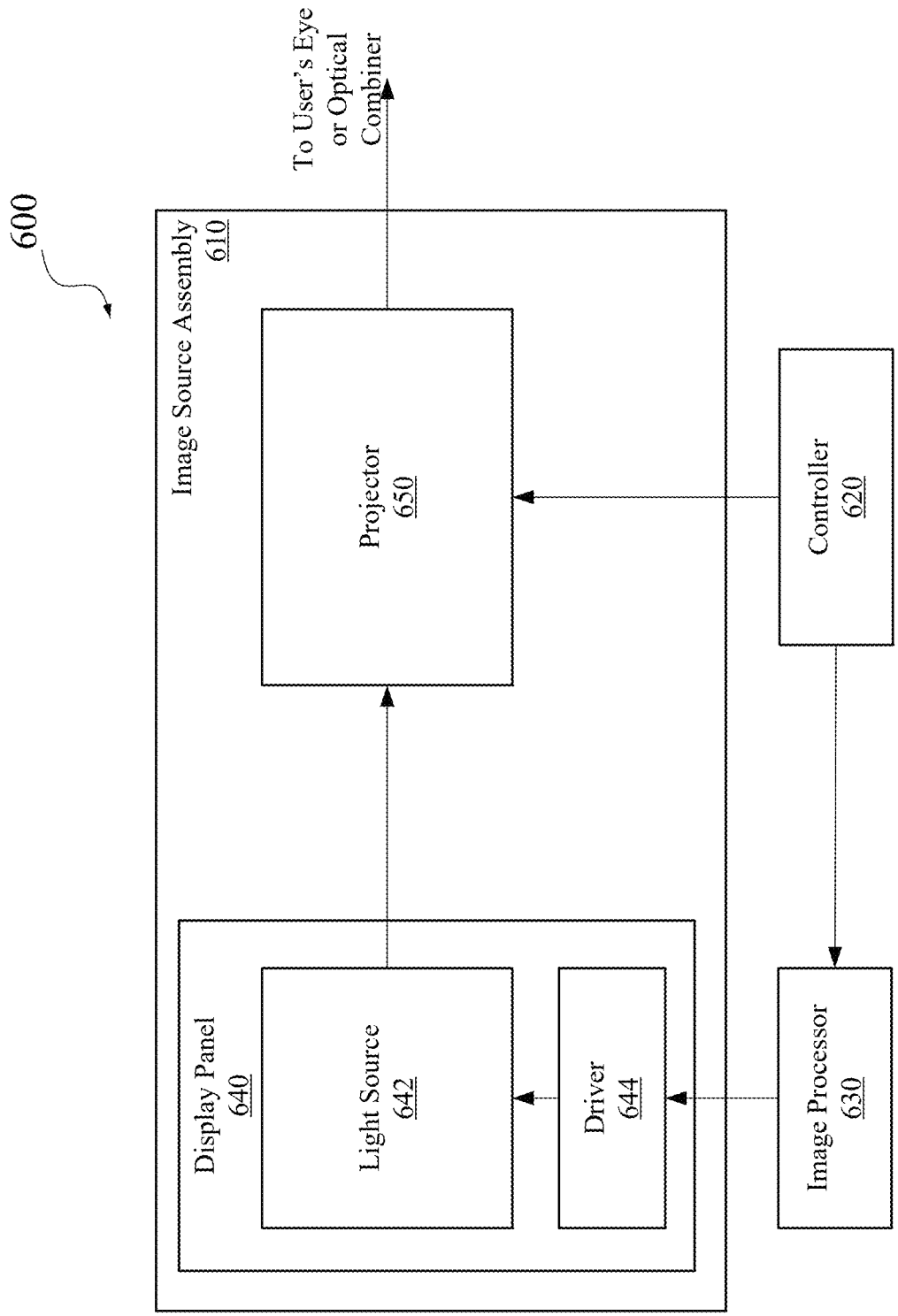
FIG. 6 illustrates an example of an image source assembly in an augmented reality system.

FIG. 6 illustrates an example of an image source assembly 610 in a head-mounted display system 600 according to certain embodiments. Image source assembly 610 may include, for example, a display panel 640 that may generate display images to be projected to the user's eyes, and a projector 650 that may project the display images generated by display panel 640 to a waveguide display as described above with respect to FIGS. 4-5B. Display panel 640 may include a light source 642 and a drive circuit 644 for light source 642. Light source 642 may include, for example, light source 510 or 540. Projector 650 may include, for example, freeform optical element 560, scanning mirror 570, and/or projection optics 520 described above. Head-mounted display system 600 may also include a controller 620 that synchronously controls light source 642 and projector 650 (e.g., scanning mirror 570). Image source assembly 610 may generate and output an image light to a waveguide display (not shown in FIG. 6), such as waveguide display 530 or 580. As described above, the waveguide display may receive the image light at one or more input-coupling elements, and guide the received image light to one or more output-coupling elements. The input and output coupling elements may include, for example, a diffraction grating, a holographic grating, a prism, or any combination thereof. The input-coupling element may be chosen such that total internal reflection occurs with the waveguide display. The output-coupling element may couple portions of the total internally reflected image light out of the waveguide display.

As described above, light source 642 may include a plurality of light emitters arranged in an array or a matrix. Each light emitter may emit monochromatic light, such as red light, blue light, green light, infra-red light, and the like. While RGB colors are often discussed in this disclosure, embodiments described herein are not limited to using red, green, and blue as primary colors. Other colors can also be used as the primary colors of head-mounted display system 600. In some embodiments, a display panel in accordance with an embodiment may use more than three primary colors. Each pixel in light source 642 may include three subpixels that include a red micro-LED, a green micro-LED, and a blue micro-LED. A semiconductor LED generally includes an active light emitting layer within multiple layers of semiconductor materials. The multiple layers of semiconductor materials may include different compound materials or a same base material with different dopants and/or different doping densities. For example, the multiple layers of semiconductor materials may include an n-type material layer, an active region that may include hetero-structures (e.g., one or more quantum wells), and a p-type material layer. The multiple layers of semiconductor materials may be grown on a surface of a substrate having a certain orientation.

Controller 620 may control the image rendering operations of image source assembly 610, such as the operations of light source 642 and/or projector 650. For example, controller 620 may determine instructions for image source assembly 610 to render one or more display images. The instructions may include display instructions and scanning instructions. In some embodiments, the display instructions may include an image file (e.g., a bitmap file). The display instructions may be received from, for example, a console, such as console 110 described above with respect to FIG. 1. The scanning instructions may be used by image source assembly 610 to generate image light. The scanning instructions may specify, for example, a type of a source of image light (e.g., monochromatic or polychromatic), a scanning rate, an orientation of a scanning apparatus, one or more illumination parameters, or any combination thereof. Controller 620 may include a combination of hardware, software, and/or firmware not shown here so as not to obscure other aspects of the present disclosure.

In some embodiments, controller 620 may be a graphics processing unit (GPU) of a display device. In other embodiments, controller 620 may be other kinds of processors. The operations performed by controller 620 may include taking content for display and dividing the content into discrete sections. Controller 620 may provide to light source 642 scanning instructions that include an address corresponding to an individual source element of light source 642 and/or an electrical bias applied to the individual source element. Controller 620 may instruct light source 642 to sequentially present the discrete sections using light emitters corresponding to one or more rows of pixels in an image ultimately displayed to the user. Controller 620 may also instruct projector 650 to perform different adjustments of the light. For example, controller 620 may control projector 650 to scan the discrete sections to different areas of a coupling element of the waveguide display (e.g., waveguide display 580) as described above with respect to FIG. 5B. As such, at the exit pupil of the waveguide display, each discrete portion is presented in a different respective location. While each discrete section is presented at a different respective time, the presentation and scanning of the discrete sections occur fast enough such that a user's eye may integrate the different sections into a single image or series of images.

Image processor 630 may be a general-purpose processor and/or one or more application-specific circuits that are dedicated to performing the features described herein. In one embodiment, a general-purpose processor may be coupled to a memory to execute software instructions that cause the processor to perform certain processes described herein. In another embodiment, image processor 630 may be one or more circuits that are dedicated to performing certain features. While image processor 630 in FIG. 6 is shown as a stand-alone unit that is separate from controller 620 and drive circuit 644, image processor 630 may be a sub-unit of controller 620 or drive circuit 644 in other embodiments. In other words, in those embodiments, controller 620 or drive circuit 644 may perform various image processing functions of image processor 630. Image processor 630 may also be referred to as an image processing circuit.

In the example shown in FIG. 6, light source 642 may be driven by drive circuit 644, based on data or instructions (e.g., display and scanning instructions) sent from controller 620 or image processor 630. In one embodiment, drive circuit 644 may include a circuit panel that connects to and mechanically holds various light emitters of light source 642. Light source 642 may emit light in accordance with one or more illumination parameters that are set by the controller 620 and potentially adjusted by image processor 630 and drive circuit 644. An illumination parameter may be used by light source 642 to generate light. An illumination parameter may include, for example, source wavelength, pulse rate, pulse amplitude, beam type (continuous or pulsed), other parameter(s) that may affect the emitted light, or any combination thereof. In some embodiments, the source light generated by light source 642 may include multiple beams of red light, green light, and blue light, or any combination thereof.

Projector 650 may perform a set of optical functions, such as focusing, combining, conditioning, or scanning the image light generated by light source 642. In some embodiments, projector 650 may include a combining assembly, a light conditioning assembly, or a scanning mirror assembly. Projector 650 may include one or more optical components that optically adjust and potentially re-direct the light from light source 642. One example of the adjustment of light may include conditioning the light, such as expanding, collimating, correcting for one or more optical errors (e.g., field curvature, chromatic aberration, etc.), some other adjustments of the light, or any combination thereof. The optical components of projector 650 may include, for example, lenses, mirrors, apertures, gratings, or any combination thereof.

Projector 650 may redirect image light via its one or more reflective and/or refractive portions so that the image light is projected at certain orientations toward the waveguide display. The location where the image light is redirected toward the waveguide display may depend on specific orientations of the one or more reflective and/or refractive portions. In some embodiments, projector 650 includes a single scanning mirror that scans in at least two dimensions. In other embodiments, projector 650 may include a plurality of scanning mirrors that each scan in directions orthogonal to each other. Projector 650 may perform a raster scan (horizontally or vertically), a bi-resonant scan, or any combination thereof. In some embodiments, projector 650 may perform a controlled vibration along the horizontal and/or vertical directions with a specific frequency of oscillation to scan along two dimensions and generate a two-dimensional projected image of the media presented to user's eyes. In other embodiments, projector 650 may include a lens or prism that may serve similar or the same function as one or more scanning mirrors. In some embodiments, image source assembly 610 may not include a projector, where the light emitted by light source 642 may be directly incident on the waveguide display.

As described above, light sources or image sources such as LCD displays, OLED displays, micro-OLED displays, ILED displays, QLED displays, micro-LED displays, AMOLED displays, TOLED displays, and the like, may have limited resolution, brightness, field of view, and power efficiency, and/or may have high costs in order to achieve better resolution, brightness, field of view, and power efficiency. To achieve a high resolution, a large number (e.g., a few millions) of light emitters (pixels) may be used, and thus the displays may be relatively large due to finite sizes of the light emitters and may have high power consumption due to the large number of light emitters. Large display optics may also need to be used for large displays. Thus, the head-mounted display system may have a large form factor and a high weight.

Some head-mounted display systems may display images to users by, for example, scanning one or more collimated light beams according to a scanning pattern. In one example, a single light beam (e.g., a laser beam) that may have a high intensity and high spectral purity may be steered to display images to users. Each pixel of the image may be displayed by steering the light beam towards a respective direction. Pixels of the image may be displayed sequentially (pixel-by-pixel) by sequentially steering the light beam towards different directions. The light beams can be steered at a small angular step over a large angular range to provide a large field of view and high resolution. Therefore, light beam scanning-based head-mounted display systems may be able to achieve the desired resolution (e.g., an angular resolution about 2 arc-min or better), brightness, field of view, power efficiency, and the like, with a relatively low system complexity and cost. In some augmented reality head-mounted display systems, in order to provide optical see-through capabilities and pupil replication capabilities, a waveguide may be used as an optical combiner as described above with respect to, for example, FIGS. 4-5B, where the light beam may be steered to different directions toward the waveguide. The steered light beam may be incident on the waveguide at different incidence angles, and may be coupled into the waveguide at different angles by one or more input couplers to propagate within the waveguide at different directions, for example, through total internal reflection. The light beam propagating within the waveguide at different angles may be coupled out of the waveguide at different directions towards an eyebox at one or more locations of the waveguide by one or more output couplers, thereby sequentially forming an image in a large eyebox.

Figure 7:
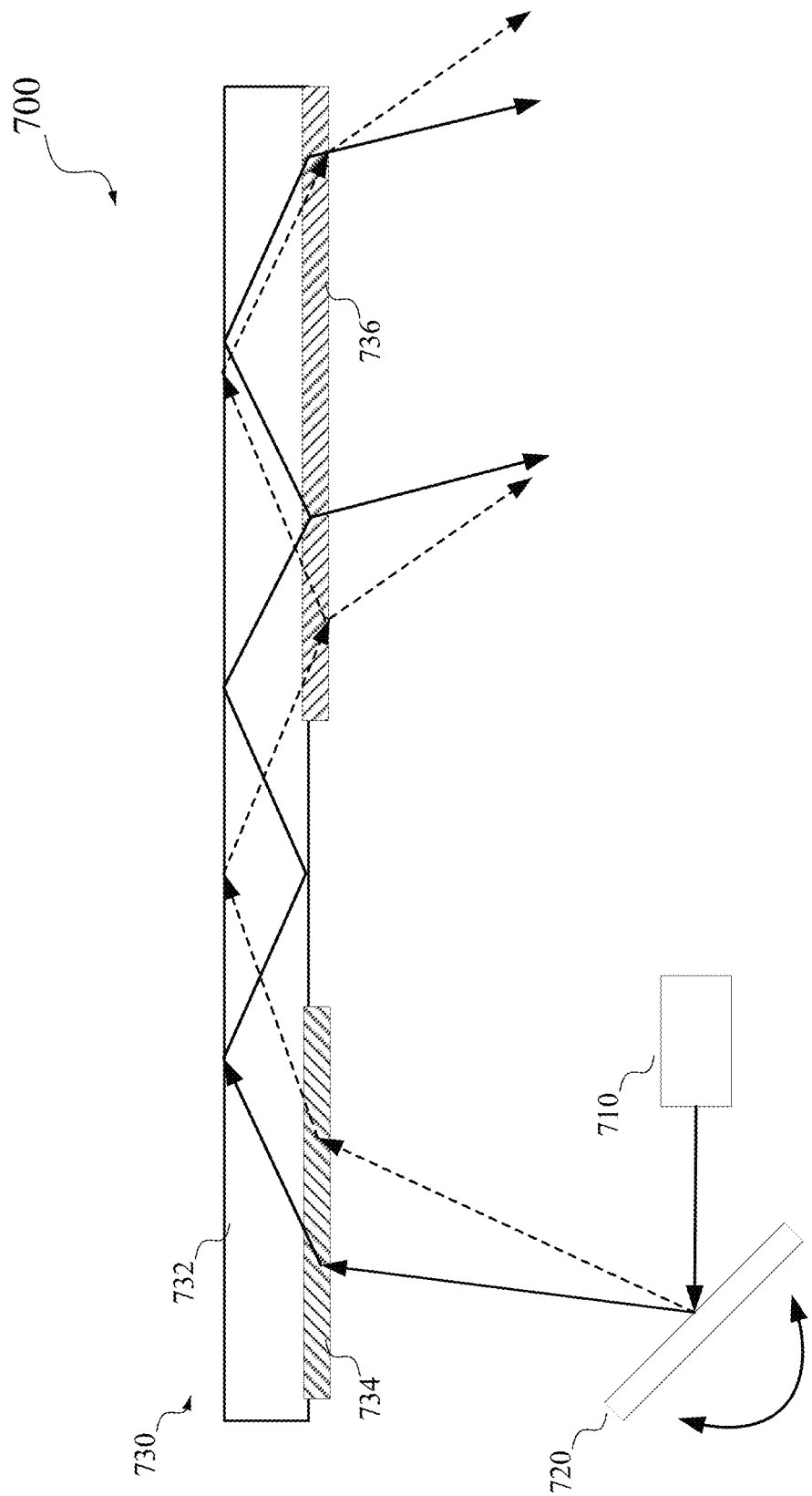
FIG. 7 illustrates an example of a light beam scanning-based head-mounted display system.

FIG. 7 illustrates an example of a light beam scanning-based head-mounted display system 700 according to certain embodiments. In the illustrated example, head-mounted display system 700 may include a light source 710, a scanner 720, a waveguide display 730, and one or more controllers (not shown) that may control light source 710 and scanner 720. In some examples, light source 710 may include a laser and collimation optics. In some examples, the laser may emit continuous-wave (CW) light. In some examples, the laser or the CW output of the laser may be modulated such that light source 710 may emit a pulsed laser beam that may include a series of short laser pulses. In some examples, the modulation may include modulating the amplitude of the laser beam, turning on and off the output of the laser, generating a series of laser pulses at a certain repetition rate, and the like, or a combination thereof. The laser beam may be collimated by the collimation optics, and may then be steered by scanner 720 according to a scan pattern to generate a two-dimensional image. Scanner 720 may include, for example, a 2D scanning MEMS mirror or two cascaded 1D scanning MEMS mirrors. The modulation of light source 710 and the scanning of scanner 720 may be synchronized so that light of desired brightnesses may be directed to desired directions to display the image. For example, light source 710 and scanner 720 may be controlled by a same central controller, or may be controlled by two controllers that may be synchronized. As illustrated, the laser beam emitted by light source 710 may be directed to one direction at a first time instant and incident on waveguide display 730 at a first incidence angle, and may be directed to a second direction at a second time instant and incident on waveguide display 730 at a second incidence angle.

As described above with respect to, for example, FIGS. 4-5B, waveguide display 730 may include a substrate 732 that may be transparent to visible light, such as a glass substrate, a polycarbonate substrate, a SiC substrate, a plastic substrate, and the like. In some examples, substrate 732 may include two or more sub-layers bonded together. One or more input couplers 734 and one or more output couplers 736 may be formed at the surfaces of substrate 732 or may be embedded in substrate 732 (e.g., between sub-layers). Input couplers 734 and output couplers 736 may include, for example, holographic grating couplers, surface-relief grating couplers, polarization volume holograms (PVHs), and the like. Laser beams incident on input couplers 734 from different directions may be coupled into substrate 732 by input couplers 734, may propagate within substrate 732 at different directions, and may be coupled out of substrate 732 at multiple locations by output couplers 736 to propagate in different directions towards an eyebox of head-mounted display system 700.

In some examples, scanner 720 may steer the laser beam according to a "raster" scanning or "Lissajous" scanning pattern. Each pixel of the image may be displayed by steering the laser beam towards a respective direction. For pixels that need to be on (bright pixels) in an image, the laser beam may be on when it is steered to the corresponding direction. In some examples, the laser beam may be turned on or off by modulating the laser source or the output of the laser source, to generate laser pulses with desired durations, where the brightness of each bright pixel may depend on the duration of the laser pulse for the pixel. In some examples, the brightness of each bright pixel may depend on the dwell time of the laser beam for the pixel. In this way, pixels of the image may be displayed sequentially pixel by pixel by steering the laser beam towards different directions. The sequential pixel displaying can be performed at fast speeds to achieve sufficiently high frame rates. For instance, to display images with a resolution of 1000×1000 pixels (1,000,000 pixels) at a frame rate of 60 Hz, each pixel must be displayed within about 16.67 ns (1/60/1,000,000) on average.

Figure 8A:
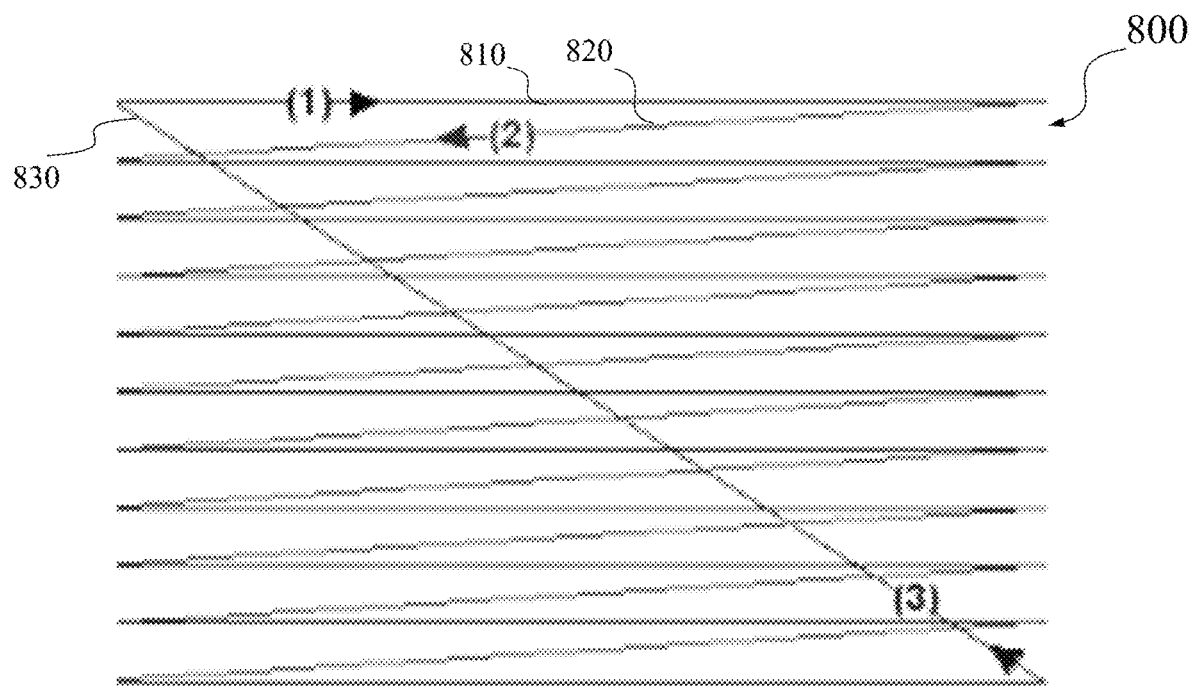
FIG. 8A illustrates an example of a raster scanning pattern.

FIG. 8A illustrates an example of a raster scanning pattern 800. In the illustrated example, scanning pattern 800 may include a plurality of scan lines 810 and transition lines 820 and 830. Each scan line 810 may cover a row of pixels, and the plurality of scan lines 810 may cover all pixels in the field of view. The light beam may be at least periodically turned on when it is steered along a scan line 810. After being steered along each scan line 810, the light beam may be turned off while the scanner transitions along a transition line 820 from the end of the scan line to the beginning of the next scan line. In some examples, there may be pixels on transition lines 820, and the laser beam may be at least periodically turned on when the laser beam is steered along transition lines 820. After the laser beam has been steered along the last scan line 810, the laser beam may be turned off while the scanner transitions along a transition line 830 from the end of the last scan line 810 to the beginning of the first scan line 810.

Figure 8B:
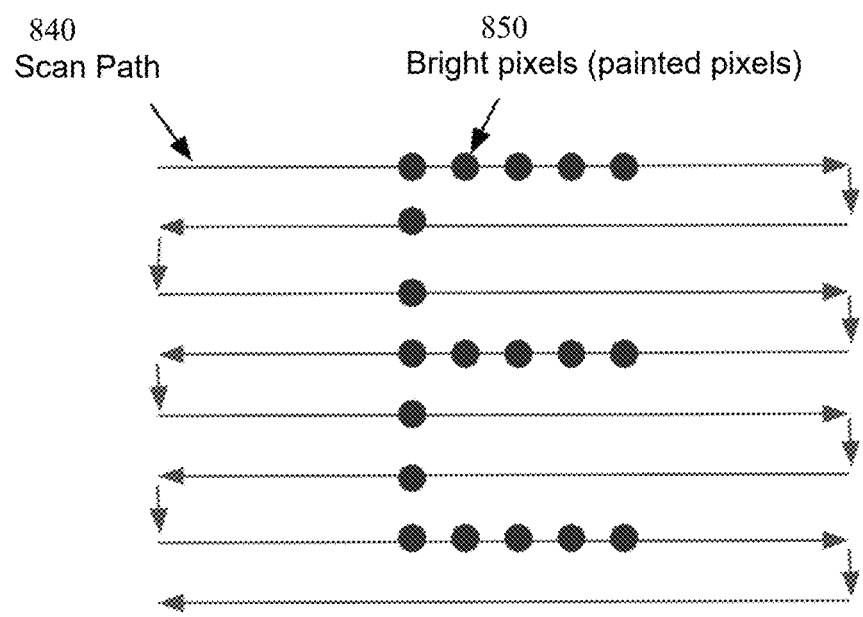
FIG. 8B illustrates an example of displaying an image using a pulsed light beam and a raster scanning pattern.

FIG. 8B illustrates an example of displaying an image using a pulsed light beam and a raster scanning pattern. The raster scanning pattern may be similar to or different from the raster scanning pattern shown in FIG. 8A, and may include scan lines 840 that may be traversed from opposite directions as shown by the arrows in FIG. 8B. In the example illustrated in FIG. 8B, a letter "E" may need to be displayed. The laser beam may be steered along scan line 840, and may include short laser pulses. For pixels that do not need to be on (dark pixels), the laser beam nay be turned off when it is steered to directions corresponding to these dark pixels. For each pixel 850 that needs to be on (bright pixel), the laser beam may be turned on for a short period of time (thereby emitting a short laser pulse) when the laser beam is steered to the corresponding direction. As illustrated, the laser beam may need to be steered along a pre-determined path to cover all pixels regardless of the content to be displayed, for example, even if only a few pixels need to be bright. Therefore, the maximum laser beam dwell time (e.g., the duration of a laser pulse) for each pixel may be fixed for a certain image frame rate and image resolution, even if the image to be displayed has a low fill factor (e.g., only a small fraction of all pixels needs to be bright).

Figure 8C:
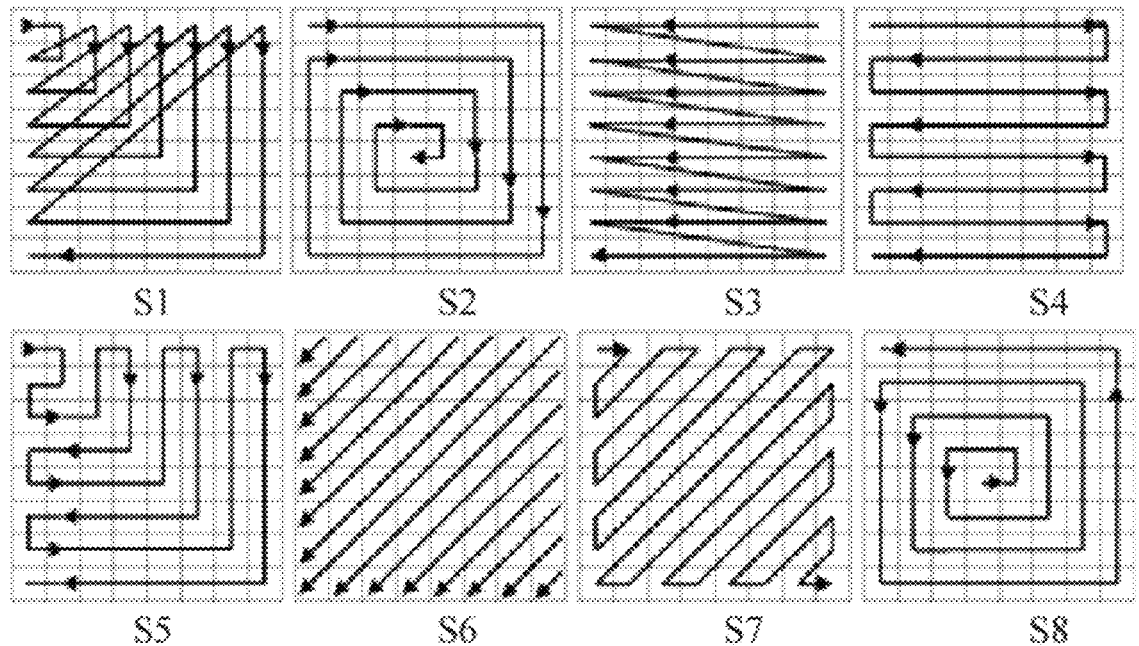
FIG. 8C illustrates examples of scanning patterns.

FIG. 8C illustrates some other examples of scanning patterns. These examples of scanning patterns S1-S8 may be used to display rectangular image frames, and may be content-independent. Even if the image to be displayed has a low fill factor, the scanning pattern may need to be fully traversed. Therefore, the laser beam dwell time at each pixel may be constant, whether the displayed image has a low or high fill factor for bright pixels. Some of these scanning pattern may include no transition lines or may include short transition lines.

Figure 8D:
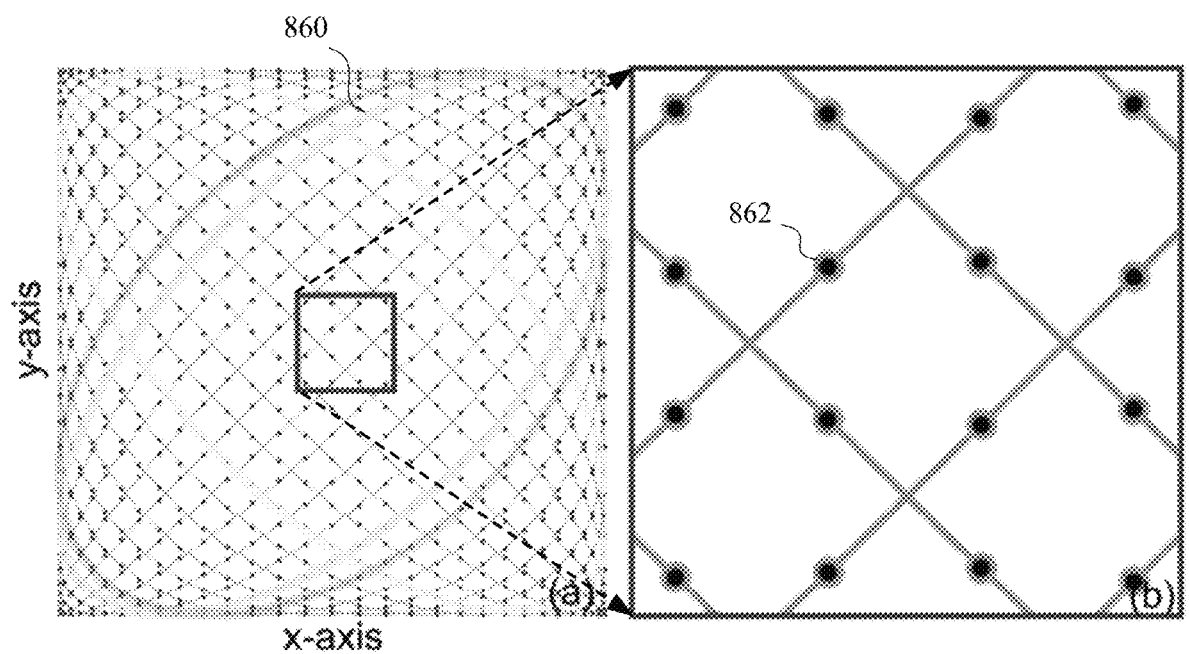
FIG. 8D illustrates an example of displaying an image using a pulsed light beam and a Lissajous scanning pattern.

FIG. 8D illustrates an example of displaying an image using a pulsed light beam and a Lissajous scanning pattern 860. In one example, Lissajous scanning pattern 860 may be implemented using bi-resonant MEMS beam steering system. As scanning patterns S1-S8, Lissajous scanning pattern 860 may also be independent of the content to be displayed. FIG. 8D also shows a zoom-in view of a subset of equally spaced pixels. A laser pulse may be emitted when the laser beam is steered to a direction corresponding to a pixel 862 that may need to be bright, and the laser beam may be turned off when the laser beam is steered to a direction corresponding to a pixel 862 that may need to be dark. The laser beam dwell time (e.g., pulse duration) at each pixel may be constant, whether the displayed image has a low or high fill factor for bright pixels.

As described above, in "raster" scanning or "Lissajous" scanning, high-speed laser modulation may be used to generate short laser pulses to generate bright pixels, thereby projecting arbitrary pixel content. A bright pixel may be displayed to the user when the laser emits a short laser pulse while the scanner points to a corresponding direction for the pixel. The brightness of each bright pixel may be limited due to the short dwell time and short laser pulse for each pixel (e.g., less than about 20 ns or less than about 10 ns), whether the displayed image has a low or high fill factor for bright pixels. To achieve a high brightness, the short-pulsed laser beam may need to have high peak and average optical power. However, higher electrical driving power may be needed to achieve higher optical power (or brightness) in these short-pulsed laser sources. Furthermore, in waveguide-based head-mounted display systems, such as head-mounted display system 700, the optical efficiencies from the light source, through the input coupler, waveguide, and output coupler(s), to the eyebox may be low, such as about 1% or a few percents, due to, for example, low efficiencies of the input and output couplers. Due to the lower optical efficiencies of waveguide-based head-mounted display systems, higher optical output power from the laser sources may be needed to achieve the desired brightness in the images displayed to the eyebox of the waveguide-based head-mounted display systems. To achieve the higher optical output power, the head-mounted display systems may need to have high electrical driving power. In addition, the optical systems of the light beam scanning-based head-mounted display systems may need to have high damage thresholds in order to manipulate the high-power short-pulse laser beams without being damaged.

In many artificial reality applications, such as many augmented reality displays, the images to be displayed may have low fill factors, where the content may be displayed using only a small portion of the available pixels for each image frame. However, the "raster" or "Lissajous" scanning techniques may still need to scan to all pixel directions, and the light beam dwell time for each pixel may be constant and short, because the scanning path is fixed and is content independent. Therefore, to achieve the desired image brightness, the short-pulsed laser beams may need to have high peak power, and thus the head-mounted display systems may need to have high electrical peak power and high laser damage thresholds. In addition, scanning to corresponding directions for all pixel regardless of the content to be displayed may also consume more electrical power for driving the scanning elements (e.g., MEMS mirrors) of the head-mounted display systems.

According to certain embodiments disclosed herein, vector scanning techniques may be used in some head-mounted display systems (e.g., some augmented reality or mixed reality display systems that include waveguide displays) to steer a light beam according to a scan path that may be content dependent, where the light beam may not need to be steered into all directions for displaying most 2D images. In vector scanning, the content to be displayed may be defined using coordinates and lines, rather than pixels in a pixel grid, where the light beam may function as a paintbrush and may be steered by a beam steering device according to a scan path to paint an image. The beam steering device may be controlled to steer light according to an arbitrary content-dependent scan path, rather than according to a fixed scan path as in "raster" scanning or "Lissajous" scanning. The scan path may be determined based on the content to be displayed. To display different content, different vector scan paths may be used. The color, brightness, pulse duration, and the width of the light beam may be controlled during the scanning process to generate the desired display content.

In some examples, the scan path may be optimized to reduce the overall length of the scan path. The light beam may not need to be turned on and off for each pixel direction, and can remain on when the light beam is steered along a straight or curved line. The light source can be turned off and the steering can be at a faster speed during transitions between content of the image, thereby reducing power consumption and increasing the dwell time for content to be displayed. Therefore, compared with "raster" scanning or "Lissajous" scanning techniques, vector scanning techniques disclosed herein may display an image using a content-dependent scan path that may minimize the scan path length and reduce the power used for the scanning. Because the scan path length may be reduced and the light beam may not need to be steered into all directions for displaying a 2D image, the effective dwell time of the light beam at each steering direction can be increased to increase the brightness of each image frame. Therefore, to achieve the desired brightness of the displayed image, the optical output power of the light source can be reduced. For example, to display a low-fill image that includes only one line at a frame rate of 60 Hz and an effective resolution of 1000×1000 pixels, the dwell time at each scanning direction can be about 16.67 µs (1/60/1000), rather than about 16.67 ns as in raster scanning or "Lissajous" scanning. As such, with the same optical output power of the light beam, the brightness of the content displayed using vector scanning can be about 1000 times of that of the content displayed using raster scanning or "Lissajous" scanning. Alternatively, compared with raster scanning or "Lissajous" scanning, the same or higher brightness can be achieved by vector scanning using a light beam with a much lower power.

Furthermore, in some examples, the scan path can be modified to include curves or loops (rather than sharp turns) in the scan path. Using curves or loops (rather than sharp turns) may reduce the electrical power used for steering the light beam. For example, in MEMS vector scanner, there may be a relationship between the torque needed to actuate (e.g., rotate) the MEMS mirror and the drive power. The scan path may be optimized to maintain sharp corners in the content while reducing the electrical power used for steering the light beam, for example, by adding a loop at a sharp corner on the scan path and turning off the illumination source during the steering according to the loop. Using curves or loops (rather than sharp turns) in the scan path can reduce the torque for actuating the MEMS mirror, and thus may reduce the electrical power for actuating the MEMS mirror. Using curves or loops at sharp corners may also enable the scanner to scan at a higher speed at the sharp corners.

Figure 9:
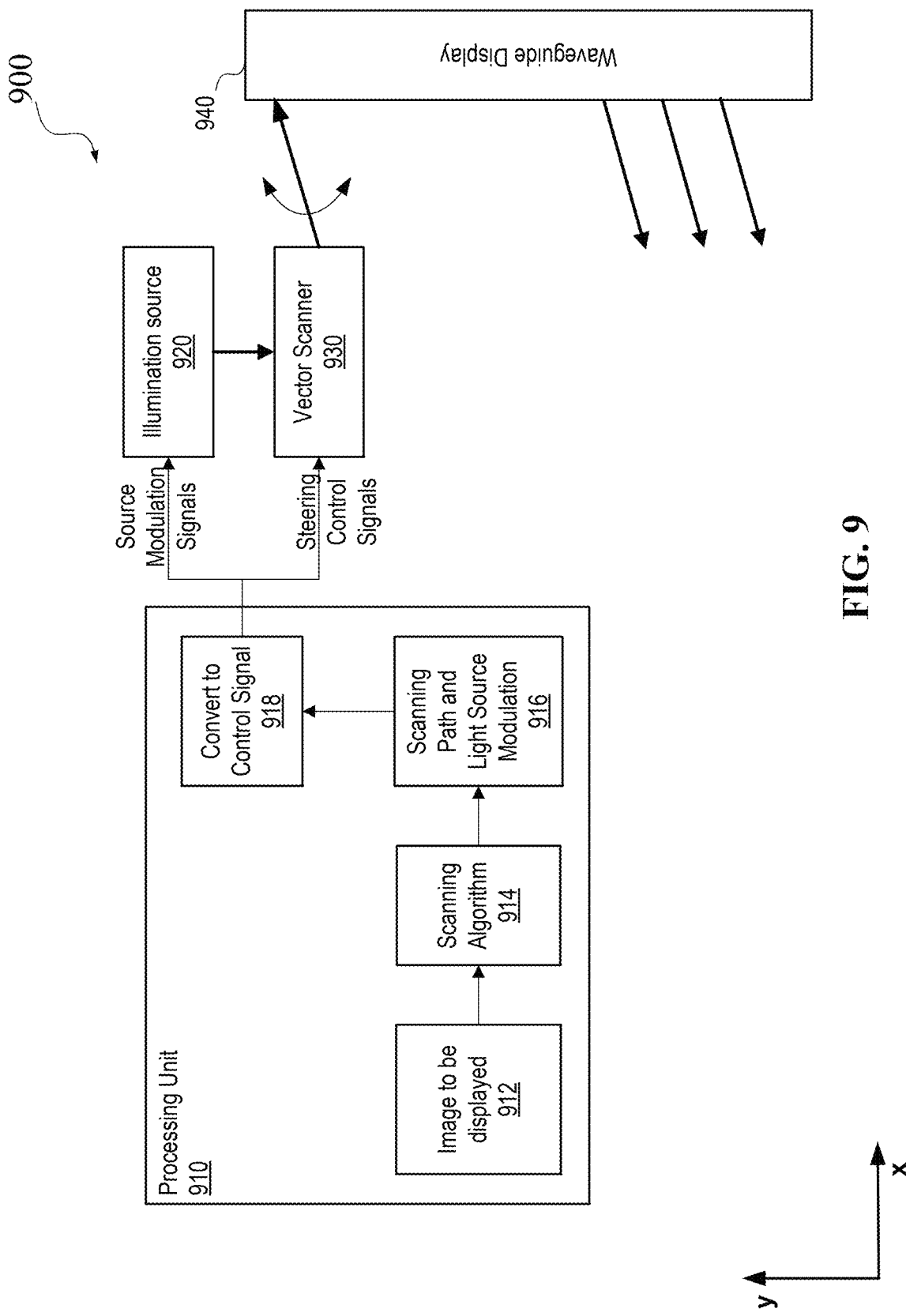
FIG. 9 illustrates an example of a vector scanning-based head-mounted display system according to certain embodiments.

FIG. 9 illustrates an example of a vector scanning-based head-mounted display system 900 according to certain embodiments. In the illustrated example, head-mounted display system 900 may include a processing unit 910, an illumination source 920, a vector scanner 930, and a waveguide display 940. Processing unit 910 may include one or more general-purpose or special-purpose processors, and may determine the images to be displayed, determine a scanning pattern for controlling vector scanner 930, determine the modulation timing for modulating illumination source 920, and generate control signals for controlling vector scanner 930 and illumination source 920.

In the example illustrated in FIG. 9, processing unit 910 may determine an image to be displayed for an image frame by executing a functional block 912. The image to be displayed may be determined based on, for example, an object in the ambient environment of head-mounted display system 900, to provide additional information regarding the object. In another example, the image to be displayed may include information requested by the user or information received by head-mounted display system 900 from another user device (e.g., a cellphone, a medical device, a computer, etc.). In another example, the image to be displayed may be determined based on the gazing direction of the user or a gesture of the user of head-mounted display system 900, to display a computer generated graph for immersive augmented reality applications (e.g., a video game).

Based on the content of the image to be displayed, processing unit 910 may implement a scanning algorithm by executing a functional block 914 to determine a vector scanning pattern for displaying the image. For example, functional block 914 may be executed to determine coordinates and scan lines (straight and/or curved) for painting or drawing an image. In one example, the scan lines may be determined by tracing edges of the content. In some examples, high-fill content may be converted to low-fill content, for example, using contours or outlines of the high-fill content. In some examples, a high-fill area of the content may be displayed using regional raster scanning to fill the area, while low-fill areas of the content may be displayed using vector scanning.

Processing unit 910 may also execute a functional block 916 to determine a vector scanning pattern by, for example, determining a sequence for traversing the scan lines and determining transition lines for connecting unconnected scan lines. The transition lines may be straight and/or curved. The vector scanning pattern may be optimized to reduce the length of the transition lines and reduce the total scan path length. Based on the vector scanning pattern, processing unit 910 may also determine the timing information for modulating illumination source 920 to emit light in appropriate time periods during the scanning process, such as the time for turning on illumination source 920, the duration of each light pulse, the time for turning off illumination source 920, the output power of illumination source 920 as a function of time, the scanning speed for each scan line, and the like. For example, the scanning speed for a scan line may be reduced when the content corresponding to the scan line needs to have higher brightness.

In some examples, processing unit 910 may execute a functional block 918 to generate control signals for controlling illumination source 920 and vector scanner 930, based on the vector scanning pattern and the timing information for modulated illumination source 920 determined using functional block 916. In some examples, the control signals output by processing unit 910 may be digital signals that may be converted to analog signals for modulating illumination source 920 or driving actuator(s) for rotating one or more mirrors (e.g., MEMs mirrors) of vector scanner 930. The control signals for modulating illumination source 920 (e.g., source modulation signals) and the control signals for controlling vector scanner 930 (e.g., steering control signals) may be synchronized so that illumination source 920 may emit light when vector scanner 930 directs the light beam to directions corresponding to the scan lines.

Illumination source 920 may be controlled by the source modulation signals to emit light during different time periods, thereby generating light pulses having different durations, intensities, and intervals. The emitted light pulses may be directed by vector scanner 930 to appropriated directions based on the steering control signals for controlling vector scanner 930. The light pulses having different propagation directions may be coupled into the waveguide (e.g., a substrate) of waveguide display 940, guided by the waveguide, and coupled out of the waveguide towards the eyebox, as described above with respect to, for example, FIG. 7. Waveguide display 940 may be similar to waveguide display 730, and may be transparent to visible light so as to allow the user to view the ambient environment by seeing through waveguide display 940.

Figure 10A:
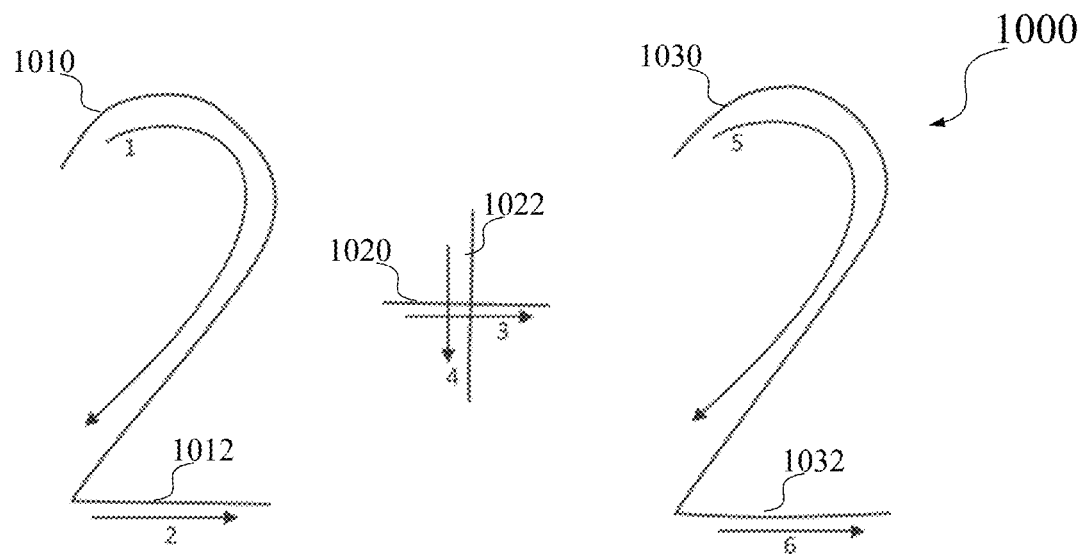
FIGS. 10A-10D illustrate examples of displaying an image using vector scanning according to certain embodiments.

FIGS. 10A-10D illustrate examples of displaying an image using vector scanning according to certain embodiments. FIG. 10A shows an image 1000 to be displayed by a light beam scanning-based head-mounted display system disclosed herein, such as head-mounted display system 900. In the illustrated example, image 1000 may include low-fill content, such as text "2+2." Image 1000 may be drawn using several lines, such as a curved line 1010 and a straight line 1012 for showing a number "2," a horizontal line 1020 and a vertical line 1022 for showing a symbol "+," and a curved line 1030 and a straight line 1032 for showing another number "2." Therefore, image 100 may be displayed by steering a light beam along the six scan lines, where light may only be emitted when the scanner steers a light beam along the six scan lines. In this way, the scanning path length can be reduced and the dwell time of the light beam at each location on the scan lines can be increased. Therefore, a high brightness may be achieved using a light beam that may have a relatively low optical power.

Figure 10B:
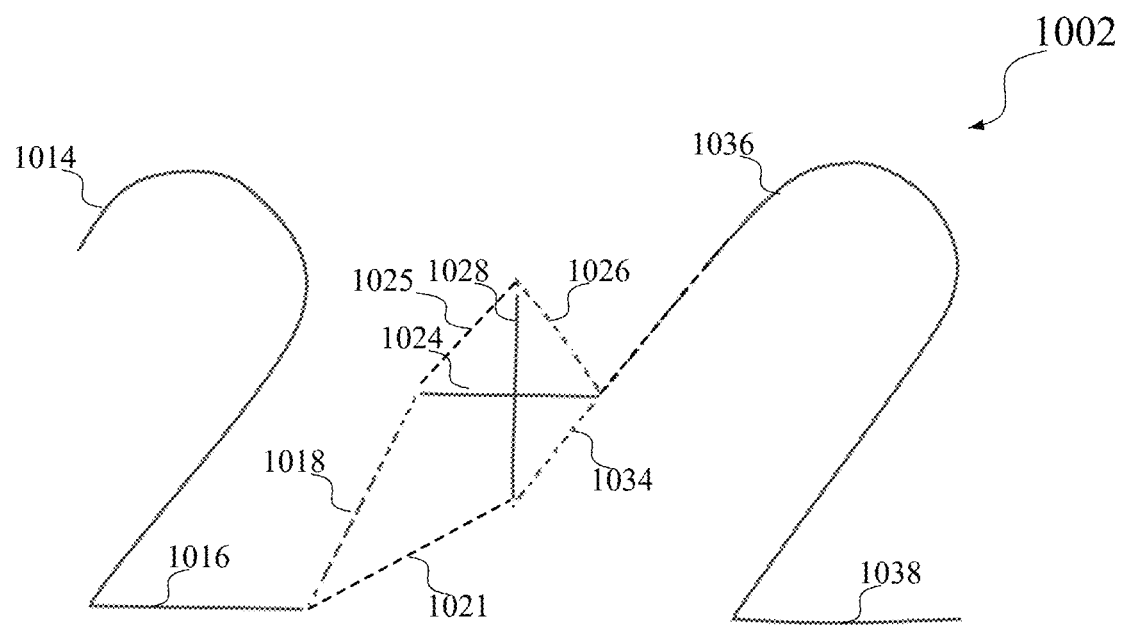

FIG. 10B illustrates an example of a vector scanning pattern 1002 for displaying image 1000 according to certain embodiments. Vector scanning pattern 1002 may include scan lines 1014, 1016, 1024, 1028, 1036, and 1038. The scan lines may be connected directly or by straight transition lines 1018, 1026, and 1034. Light may be emitted when the scanner steers the light beam to move a light spot along the scan lines, and may be turned off when the scanner scans along the transition lines. In some examples, the speed for scanning along the transition lines may be higher than the speed for scanning along the scan lines, thereby increasing the time that the light may be emitted during a frame period. The sequence of traversing the scan lines and the transition lines in the scanning pattern may be selected to reduce the total length of the transition lines. In one example, after scanning along scan line 1016, the light beam may be moved along a transition line 1021 to point to the bottom of scan line 1028, and may be moved long scan line 1028 to the top of scan line 1028. The light beam may then be moved along a transition line 1025 to point to the left end of scan line 1024, and may be moved along scan line 1024 to the right end of scan line 1024. The light beam may then be pointed to the start of scan line 1036. Such a scanning pattern may reduce the total length of the transition lines and the total scan path length of the scanning pattern.

Figure 10C:
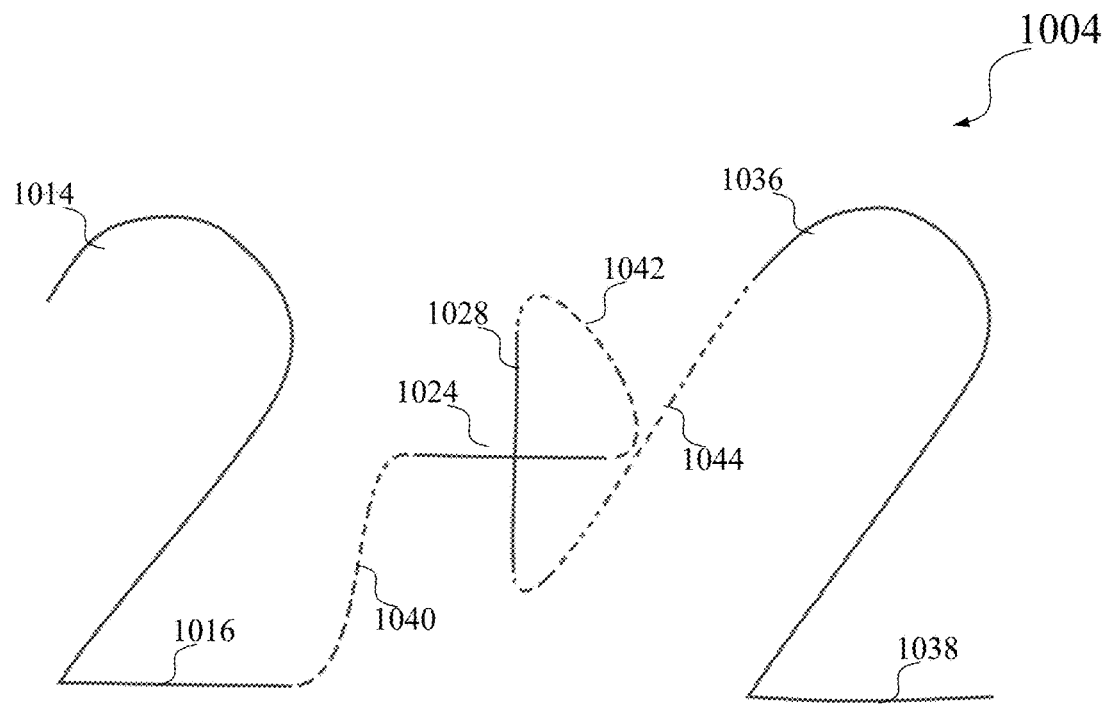

FIG. 10C illustrates another example of a vector scanning pattern 1004 for displaying image 1000 according to certain embodiments. Vector scanning pattern 1004 may be similar to vector scanning pattern 1002, but may include curved transition lines 1040, 1042, and 1044 between points of the scan lines that are not connected. Vector scanning pattern 1004 may be used for controlling scanners with beam steering mechanisms that may not make sharp turns at high speeds due to certain inertia and/or mechanical limitations or may consume more power for making sharp turns. For example, for some scanners, making sharp turns or changes of direction may need to be performed at a lower speed, which may reduce the overall scanning speed. For some scanners, such as some MEMS vector scanners, a higher torque may be needed in order to make sharp turns or changes of direction, and applying a higher torque may use more electrical power. Using the curved transition lines as shown in FIG. 10C, the scanning speed for the transition lines can be higher, and the electrical power used to steer the beam along the transition lines can be lower.

Figure 10D:
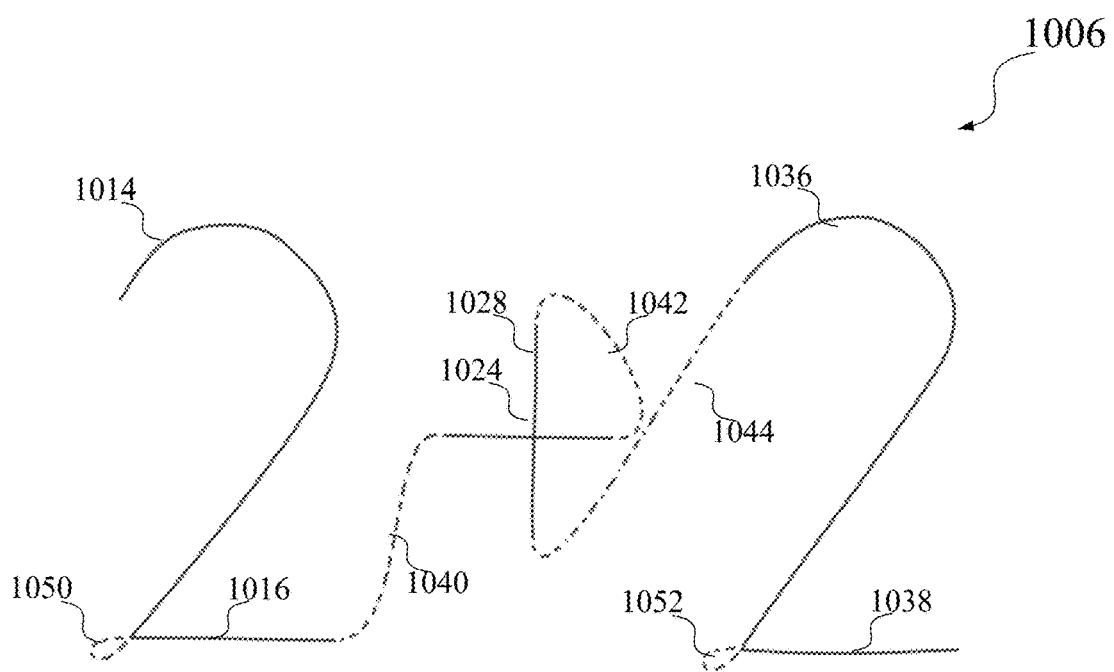

FIG. 10D illustrates yet another example of a vector scanning pattern 1006 for displaying image 1000 according to certain embodiments. Vector scanning pattern 1006 may be similar to vector scanning pattern 1004, but may include additional loops 1050 and 1052 between scan lines that may be connected but may have a small angle (less than 90°) between them. For example, scan lines 1014 and 1016 may be connected, but transition from scan line 1014 to scan line 1016 may include making a sharp turn, which may need to be performed at a lower speed and/or may need a higher torque and a higher electrical power. Including a loop 1050 between scan lines 1014 and 1016 may enable the scanning at a relative high speed with smaller torque (and lower power) for rotating the scanner.

Using the vector scanning patterns and vector scanners disclosed herein may increase the brightness of the displayed image, without using light beams with higher optical power. In one example, to project a full-fill white image with one million pixels in a half-angle circular field of view about 10° using an example of a 2D raster scanning display and a waveguide display with an overall optical efficiency about 1% and an eyebox size of 10 mm×10 mm at 100 nits, the input power to the waveguide may need to be approximately 100 nits×(0.010 m×0.010 m)×4π×sin²(10°)/1%=0.38 lumens. In contrast, to display a low-fill image including about 1000 effective pixels using the same waveguide display and a vector scanner with an 80% drawing duty cycle (e.g., due to gaps between line content), a brightness of approximately 100 nits×1,000,000 pixels/1000 pixels× 80%=80,000 nits may be achieved with the same equivalent input optical of about 0.38 lumens. To achieve the same 100 nits brightness for the content including about 1000 effective pixels using the vector scanner, the input power to the waveguide may only need to be approximately 0.38 lumens× 1000 pixels/1,000,000 pixels/80%=474 microlumens.

In some vector scanning-based head-mounted display systems, the light beam can be controlled to have different beam widths during the scanning process, such that the lines of the image generated in a single scan path may have different thicknesses. The brightness of the portion of content generated using light beams with the larger beam widths can be maintained at a high level using the same output power from the light source, for example, by reducing the scanning speed for generating the portion of content.

Figure 11A:
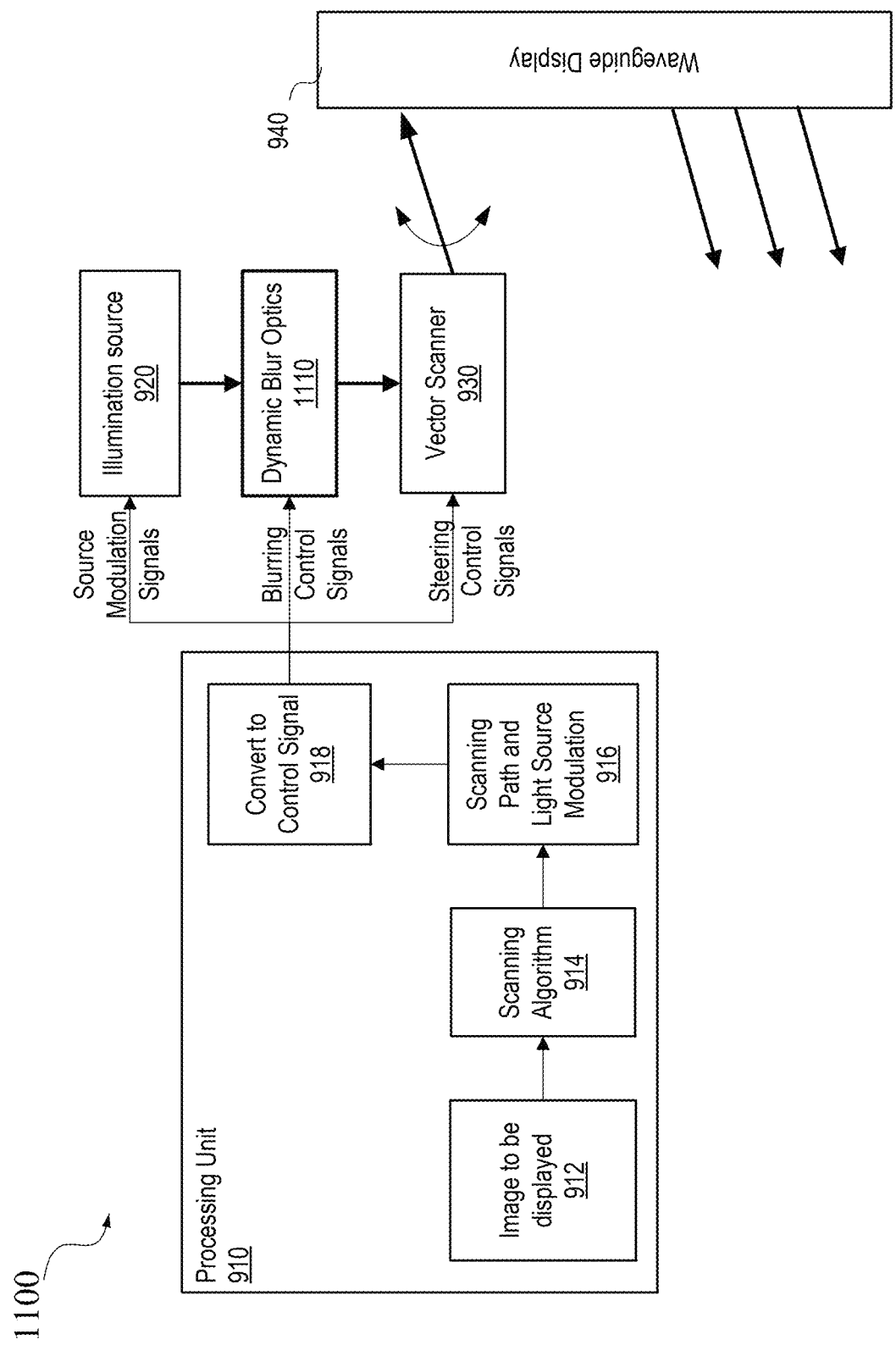
FIG. 11A illustrates an example of a vector scanning-based head-mounted display system with a variable beam width according to certain embodiments.

FIG. 11A illustrates an example of a vector scanning-based head-mounted display system 1100 with a variable beam width according to certain embodiments. Head-mounted display system 1100 may be similar to head-mounted display system 900, and may include additional dynamic blur optics 1110 that may be controlled to dynamically change the beam width of the light beam emitted by illumination source 920. For example, when the content to be displayed may be represented by lines of different thickness, processing unit 910 may determine the thicknesses of the scan lines and thus the blur needed to generate the scan lines of different thicknesses, and may also generate blurring control signals to control dynamic blur optics 1110. Dynamic blur optics may control the beam width of the light beam to be steered by vector scanner 930. Dynamic blur optics may include, for example, a dynamic lens such as a liquid lens (e.g., a liquid crystal lens), a spatial light modulator (SLM) with a variable computer generated hologram (CGH) pattern, a dynamic zooming lens, or some other optical element capable of controlling the beam width of the transmitted light beam. In some examples, dynamic blur optics 1110 may be part of illumination source 920. In some examples, dynamic blur optics 1110 may be positioned between vector scanner 930 and waveguide display 940. A larger beam width may allow more effective pixels to be covered in a single scan line, thereby reducing the number of scan lines for displaying some high-fill regions of the content.

FIG. 11B illustrates an example of a scanning pattern 1102 for displaying an image using vector scanning-based head-mounted display system 1100 according to certain embodiments. In the example illustrated in FIG. 11B, the image to be displayed may be similar to image 1000, but the symbol "+" may have a higher line width than the numbers (e.g., "2"). In another example, letters in the content of the image may include letters of different font sizes and/or styles (e.g., regular, bold, or italic fonts). If a light beam having a same beam width is used, the symbol "+" or the larger or bold fonts may need to be displayed using multiple scan lines. When dynamic blur optics such as dynamic blur optics 1110 are used in the head-mounted display system, the content with different line widths may be displayed by dynamically controlling the beam width of the light beam using the dynamic blur optics.

In the example shown in FIG. 11B, scanning pattern 1102 may include thinner scan lines 1120, 1124, 1136, and 1140, and thicker scan lines 1128 and 1132. The scan lines may be connected by transition lines 1122, 1126, 1130, 1134, and 1138, as described above with respect to FIGS. 10B-10D. When the light beam is steered along thinner scan lines 1120, 1124, 1136, and 1140, the dynamic blur optics may be controlled such that the light beam output by the dynamic blur optics may have a smaller beam width. When the light beam is steered along thicker scan lines 1128 and 1132, the dynamic blur optics may be controlled such that the light beam output by the dynamic blur optics may have a larger beam width. In this way, the symbol "+" may be displayed by steering the light beam to traverse scan lines 1128 and 1132 once.

FIGS. 12A-12C illustrate an example of a method of displaying an image by vector scanning according to certain embodiments. In the illustrated example, a high-fill image 1200 may be converted into to a low-fill image 1204 that may be represented by a plurality of lines, where the low-fill image 1204 may be displayed using the vector scanning techniques and systems disclosed herein.

In the example illustrated in FIGS. 12A-12C, high-fill image 1200 shown in FIG. 12A may first be converted into a low-fill image 1202 that can be represented by a plurality of lines as shown in FIG. 12B. For example, techniques such as edge detection techniques may be used to detect edges of objects in image 1200. The detected edges may be represented by the plurality of lines. In some examples, one or more iterations of the image conversion may be performed to further reduce the number of lines used to represent features in image 1200, while maintaining the lines for more relevant features, as shown in FIG. 12C. In this way, main features of a high-fill image such as image 1200 may be displayed by vector scanning using a small number of scan lines, where the main features may be displayed with high brightness without increasing the power consumption of the head-mounted display system. In some examples, high-fill regions of the image may be displayed using a raster scanning pattern, while other regions of the image may be displayed by a vector scanning pattern. Thus, the image may be displayed using a hybrid scanning pattern.

In some waveguide display systems, the brightness of the output image may vary across the field of view, the wavelength range, and/or eye positions. The brightness non-uniformity may be caused by the waveguide, the input/output couplers, or components between the light source and the waveguide. Uniformity correction may need to be performed to pre-compensate the light, thereby minimizing perceived non-uniformity by the eye. Uniformity correction may be achieved, for example, by changing the amount of light projected per pixel, such as by driving a micro-LED pixel with signals of different electrical power or varying the amplitude of a pulsed laser in a raster scanning display system. In some examples, the vector scanning-based head-mounted display systems disclosed herein can additionally or alternatively perform brightness uniformity correction by changing the linear and/or angular velocity of the vector scanner. As such, uniformity correction may be achieved in the vector scanning-based head-mounted display systems disclosed herein by controlling the light source modulation, the speed of the vector scanner, or a combination thereof.

Figure 13:
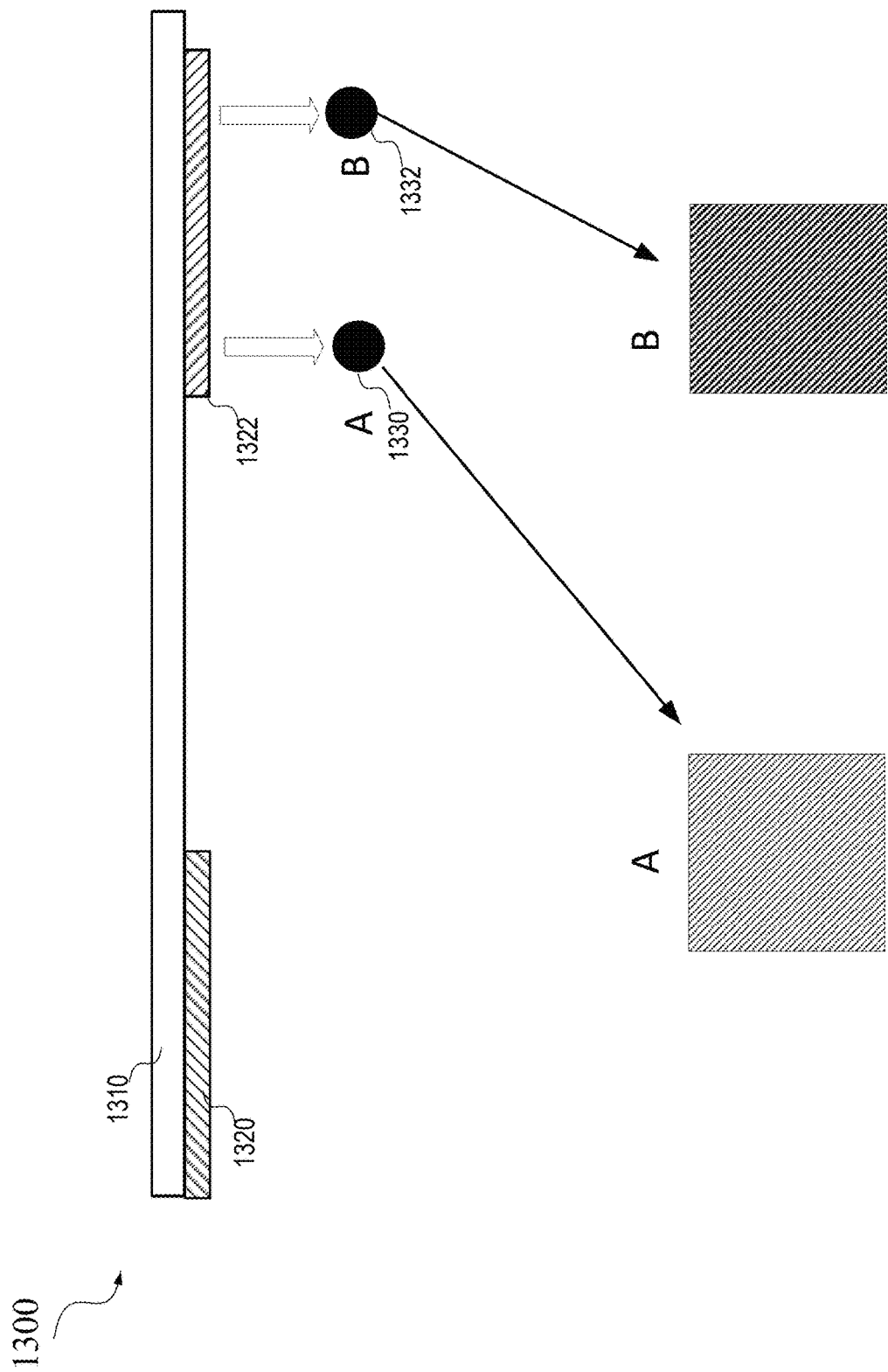
FIG. 13 illustrates an example of a waveguide-based head-mounted display system according to certain embodiments.

FIG. 13 illustrates an example of a waveguide display 1300 according to certain embodiments. Waveguide display 1300 may be similar to waveguide display 730 and waveguide display 940, and may include a waveguide 1310 (e.g., a substrate), one or more input couplers 1320, and one or more output couplers 1322 as described above. As shown in FIG. 13, the brightness of the displayed image at different regions of the eyebox may not be the same. For example, a pupil replicated by waveguide display 1300 at a position A of the eyebox may have a higher brightness than a pupil replicated by waveguide display 1300 at a position B of the eyebox. Therefore, the image perceived by a user's eye at position A and the image perceived by the user's eye at position B may have different brightnesses. The brightness of the image can also be nonuniform for different FOVs and/or different colors. The brightnesses nonuniformity may be caused by, for example, the nonuniform coupling efficiency of input couplers 1320 for different colors and/or different FOVs, the nonuniformity of the coupling efficiency of output couplers 1322 for different colors and/or different FOVs, the nonuniformity of the light intensity of the light beam guided by waveguide 1310 at different regions of output couplers 1322 (e.g., as portions of the guided light being coupled out of the waveguide by output couplers 1322 at different regions of waveguide 1310), the light engine (e.g., including the light source, the modulator, the scanner, the dynamic blur optics, etc.), and the like. It is generally desirable to minimize the brightness nonuniformity perceived by the user's eye.

According to certain embodiments disclosed herein, the brightness of the generated image may be pre-compensated during the scanning process, for example, by controlling the output power of the light source (e.g., by controlling the modulation of the light source), and/or the scanning speed (e.g., linear or angular velocity) and thus the dwell time at each scanning direction, thereby improving the brightness uniformity of the image output from a waveguide display to the eyebox. In some examples, the brightness uniformity correction can be made across the eye box (independent of the eye pupil position), such that the user's eye may perceive the same brightness regardless of the location of user's eye. In some examples, the brightness uniformity correction can be made based on the location of the user's eye pupil (and the pupil location-dependent field of view), and pre-determined nonuniformity information of the display system for different eyebox locations, FOVs, and/or colors, where the location of the user's eye pupil may be detected by an eye-tracking system (e.g., including an infrared light emitter and a camera) described with respect to, for example, FIG. 1.

FIG. 14A illustrates an example of a vector scanning-based head-mounted display system 1400 capable of non-uniformity correction according to certain embodiments. Head-mounted display system 1400 may be similar to head-mounted display system 900 or 1100. In head-mounted display system 1400, waveguide display nonuniformity data 1410 may be pre-determined and saved to a memory device. Processing unit 910, when executing functional block 916, may read waveguide display nonuniformity data 1410 from the memory device, and optionally obtaining user pupil location information from an optional eye-tracking subsystem 1420, to determine the scanning pattern, and the corresponding scanning speed (e.g., linear and/or angular velocity) and light source modulation during the scan path. For example, the scanning speed and/or the modulation of the light source (including the output power and/or the timing such as pulse width/duration of the light source) may be varied to pre-compensate the brightness nonuniformity that may otherwise be caused by illumination source 920, vector scanner 930, and/or waveguide display 940.

FIG. 14B illustrates an example of non-uniformity correction using vector scanning-based head-mounted display system 1400 of FIG. 14A according to certain embodiments. In the example shown in FIG. 14B, the output power of the illumination source may be constant, but the scanning speed of the vector scanner may be varied along a scan path for display a line, to pre-compensate possible nonuniformity of the waveguide display. For example, if the waveguided display may otherwise cause a lower brightness at the middle of the line, the vector scanner may be controlled to scan at a lower speed at the middle of the line and scan at higher speeds at the two ends of the line, such that the image before entering the waveguide display may have a higher brightness at the middle of the line and lower brightnesses at the two ends of the line, and thus the image output by the waveguide display may have a uniform brightness across the line.

Figure 15:
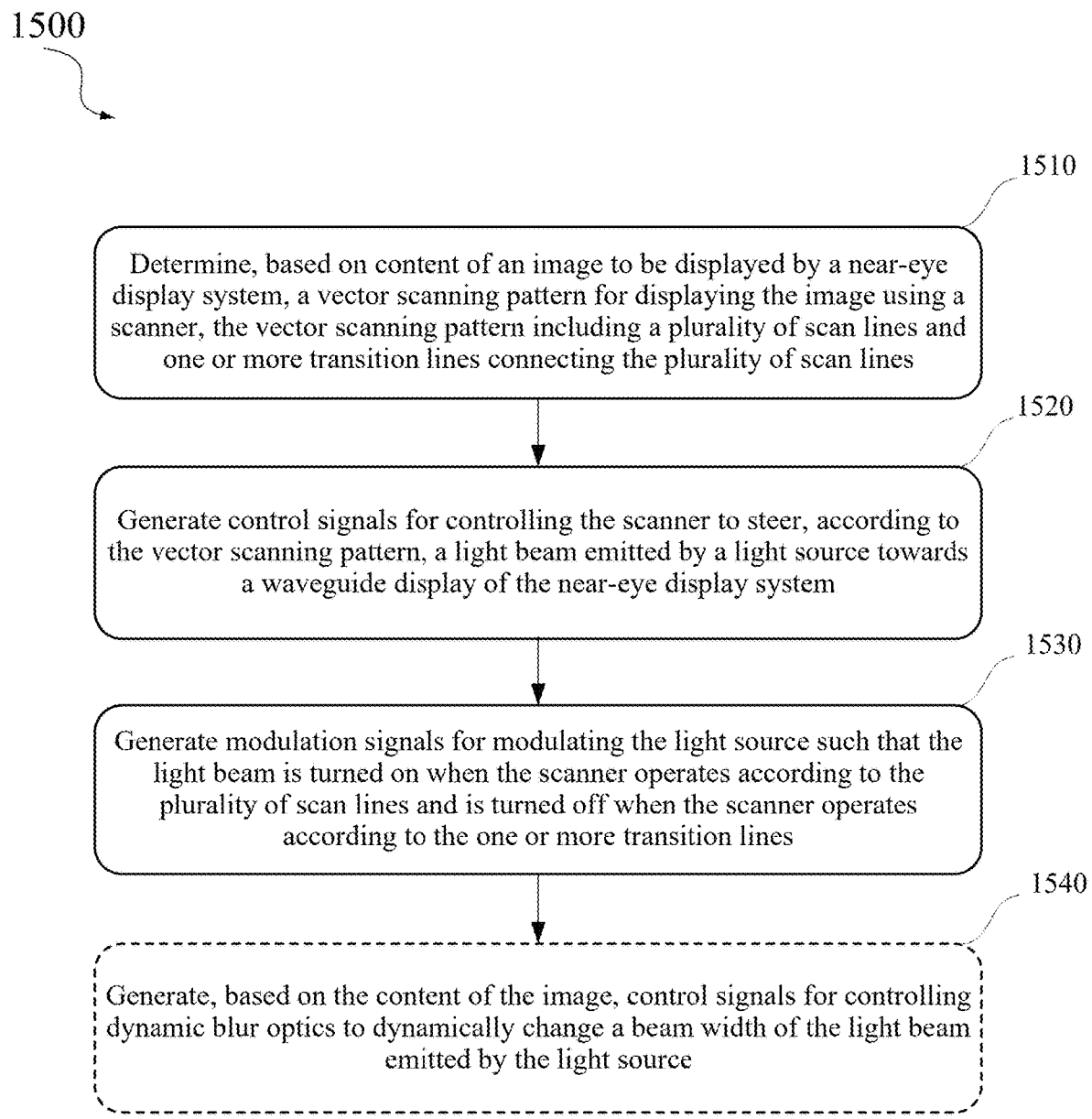
FIG. 15 includes a flowchart illustrating an example of a method of displaying an image using a vector scanning-based head-mounted display system according to certain embodiments.

FIG. 15 includes a flowchart 1500 illustrating an example of a method of displaying an image using a vector scanning-based head-mounted display system according to certain embodiments. Operations in flowchart 1500 may be performed using, for example, one or more processors or computing systems (e.g., near-eye display 120 or an electronic system 1600 described below). Although flowchart 1500 may describe the operations as a sequential order, some of the operations may be performed in parallel or concurrently. In addition, the order of the operations may be rearranged. The process may have additional operations not included in the flowchart. Some operations may be optional or may be omitted in some implementations. Some operations may be performed more than one time. Furthermore, embodiments of the methods may be implemented using hardware, software, firmware, middleware, microcode, hardware description languages, or any combination thereof. One of ordinary skill in the art would recognize many variations, modifications, and alternatives.

Operations at block 1510 of flowchart 1500 may include determining, based on content of an image to be displayed by a head-mounted display system, a vector scanning pattern for displaying the image using a scanner. The scanner may include, for example, a MEMS scanner including a micro-mirror and an actuator for rotating the micro-mirror. The vector scanning pattern may include a plurality of scan lines and one or more transition lines connecting the plurality of scan lines. At least one transition line of the one or more transition lines may be a curved line or include a curved section. In one example, the one or more transition lines may include a transition line that may form a loop to connect two scan lines of the plurality of scan lines. As described above, by using the curved transition lines or loops (rather than sharp turns) for connecting the scan lines, the torque and electrical power for rotating the micro-mirror may be reduce, and the scanning speed (e.g., angular velocity) may not need to be reduced to transition from one scan line to another scan line.

In some examples, the content of the image may be determined by one or more processors based on, for example, an object in the ambient environment or an eye gazing direction determined by an eye-tracking system. In some examples, the vector scanning pattern may be determined by detecting edges of features in the image, and determining the vector scanning pattern based on the detected edges of the features in the image. In some examples, the vector scanning pattern may be selected to minimize a total length of the scan path of the vector scanning pattern. In some examples, the vector scanning pattern may include a region that includes a regional raster scanning pattern.

Operations at block 1520 may include generating control signals for controlling a scanner to steer, according to the vector scanning pattern, a light beam emitted by a light source towards a waveguide display of the head-mounted display system. The light source may include a laser or another light emitter. The scanner may include, for example, a micro-mirror and an actuator for rotating the micro-mirror, such as a MEMS scanner. The waveguide display may include a substrate transparent to visible light, an input coupler configured to couple the light beam into the substrate such that the light beam is guided by the substrate (e.g., through total internal reflection), and an output coupler configured to couple the light beam out of the substrate at one or more locations of the substrate. Controlling the scanner to steer the light beam according to the vector scanning pattern may include controlling the scanner to steer the light beam at a first velocity when the scanner operates according to a scan line of the plurality of scan lines, and steer at a second velocity that is higher than the first velocity when the scanner operates according to a transition line of the one or more transition lines. In some examples, controlling the scanner to steer the light beam according to the vector scanning pattern may include controlling the scanner to steer the light beam at a variable velocity based on brightness information of the image when the scanner operates according to a scan line of the plurality of scan lines. In some examples, controlling the scanner to steer the light beam according to the vector scanning pattern may include generating, based on the brightness nonuniformity information of the waveguide display, control signals for varying a scanning velocity of the scanner, thereby pre-compensating the brightness nonuniformity of the waveguide display.

Operations at block 1530 may include generating modulation signals for modulating the light source such that the light beam is turned on when the scanner operates according to the plurality of scan lines and is turned off when the scanner operates according to the one or more transition lines. In some examples, the light source may include a laser that can be modulated or may include an optical modulator configured to modulate the light beam output by the laser. In some examples, controlling the scanner to steer the light beam according to the vector scanning pattern may include generating, based on the brightness nonuniformity information of the waveguide display, modulation signals for modulating an output power of the light source, thereby precompensating the brightness nonuniformity of the waveguide display.

Optional operations at block 1540 may include generating, based on the content of the image, control signals for controlling dynamic blur optics to dynamically change a beam width of the light beam, such that the image may include lines of different thicknesses. In this way, the scan path length can be further reduced. When the beam width of the light beam is changed, the scanning speed may be changed accordingly to achieve the desired brightness of the lines of different thicknesses. The dynamic blur optics may include, for example, a dynamic lens such as a liquid lens, a spatial light modulator (SLM) with a variable computer generated hologram (CGH) pattern, a dynamic zooming lens, or some other optical element capable of controlling the beam width of the transmitted light beam.

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

Figure 16:
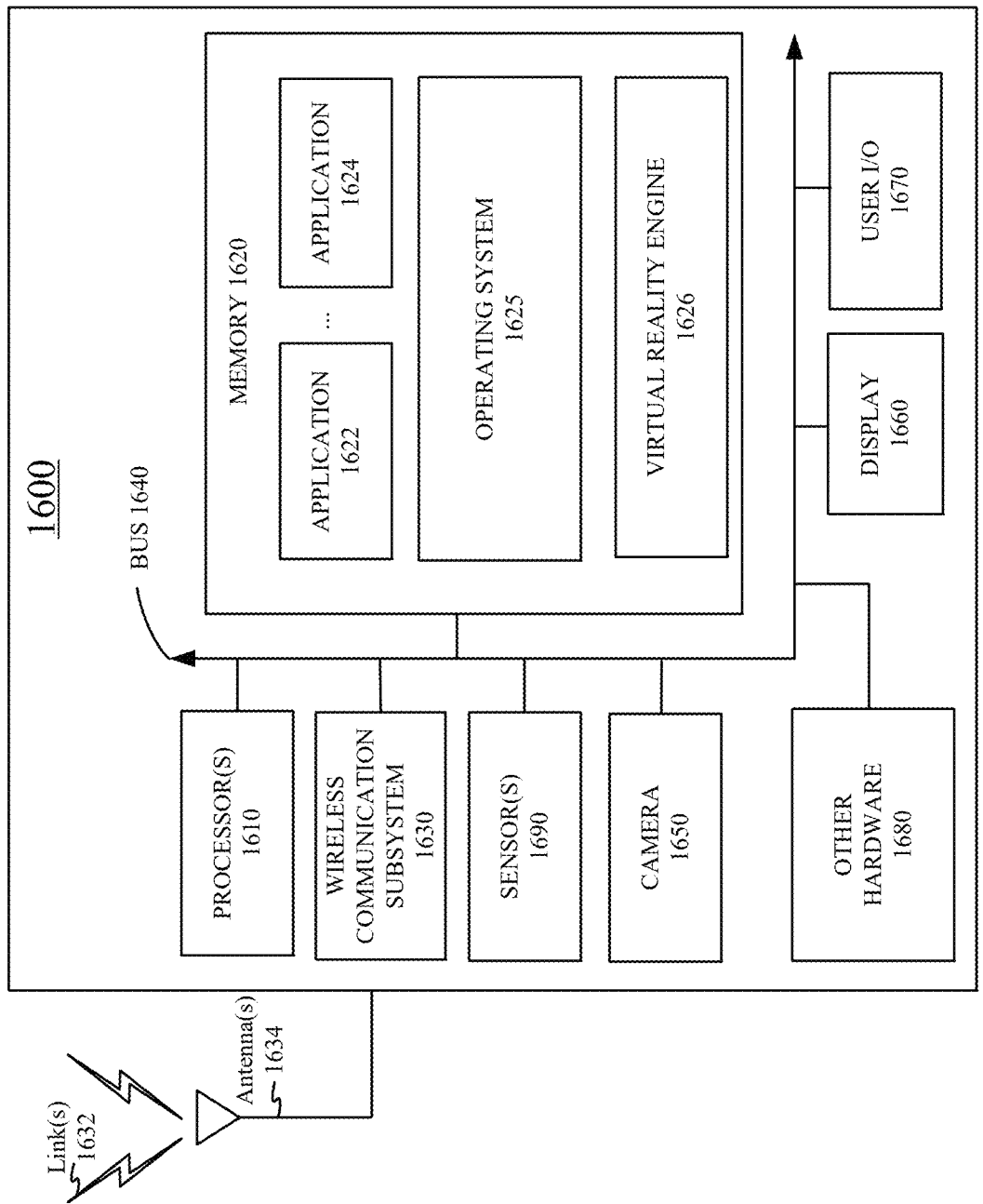
FIG. 16 is a simplified block diagram of an electronic system of an example of a near-eye display according to certain embodiments.

FIG. 16 is a simplified block diagram of an example electronic system 1600 of an example near-eye display (e.g., HMD device) for implementing some of the examples disclosed herein. Electronic system 1600 may be used as the electronic system of an HMD device or other near-eye displays described above. In this example, electronic system 1600 may include one or more processor(s) 1610 and memory 1620. Processor(s) 1610 may be configured to execute instructions for performing operations at a number of components, and can be, for example, a general-purpose processor or microprocessor suitable for implementation within a portable electronic device. Processor(s) 1610 may be communicatively coupled with a plurality of components within electronic system 1600. To realize this communicative coupling, processor(s) 1610 may communicate with the other illustrated components across a bus 1640. Bus 1640 may be any subsystem adapted to transfer data within electronic system 1600. Bus 1640 may include a plurality of computer buses and additional circuitry to transfer data.

Memory 1620 may be coupled to processor(s) 1610. In some embodiments, memory 1620 may offer both short-term and long-term storage and may be divided into several units. Memory 1620 may be volatile, such as static random access memory (SRAM) and/or dynamic random access memory (DRAM) and/or non-volatile, such as read-only memory (ROM), flash memory, and the like. Furthermore, memory 1620 may include removable storage devices, such as secure digital (SD) cards. Memory 1620 may provide storage of computer-readable instructions, data structures, program s, and other data for electronic system 1600.

In some embodiments, memory 1620 may store a plurality of applications 1622 through 1624, which may include any number of applications. Examples of applications may include gaming applications, conferencing applications, video playback applications, or other suitable applications. The applications may include a depth sensing function or eye tracking function. Applications 1622-1624 may include particular instructions to be executed by processor(s) 1610. In some embodiments, certain applications or parts of applications 1622-1624 may be executable by other hardware 1680. In certain embodiments, memory 1620 may additionally include secure memory, which may include additional security controls to prevent copying or other unauthorized access to secure information.

In some embodiments, memory 1620 may include an operating system 1625 loaded therein. Operating system 1625 may be operable to initiate the execution of the instructions provided by applications 1622-1624 and/or manage other hardware 1680 as well as interfaces with a wireless communication subsystem 1630 which may include one or more wireless transceivers. Operating system 1625 may be adapted to perform other operations across the components of electronic system 1600 including threading, resource management, data storage control and other similar functionality.

Wireless communication subsystem 1630 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1600 may include one or more antennas 1634 for wireless communication as part of wireless communication subsystem 1630 or as a separate component coupled to any portion of the system. Depending on desired functionality, wireless communication subsystem 1630 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1630 may permit data to be exchanged with a network, other computer systems, and/or any other devices described herein. Wireless communication subsystem 1630 may include a means for transmitting or receiving data, such as identifiers of HMD devices, position data, a geographic map, a heat map, photos, or videos, using antenna(s) 1634 and wireless link(s) 1632.

Embodiments of electronic system 1600 may also include one or more sensors 1690. Sensor(s) 1690 may include, for example, an image sensor, an accelerometer, a pressure sensor, a temperature sensor, a proximity sensor, a magnetometer, a gyroscope, an inertial sensor (e.g., a that combines an accelerometer and a gyroscope), an ambient light sensor, or any other similar operable to provide sensory output and/or receive sensory input, such as a depth sensor or a position sensor.

Electronic system 1600 may include a display 1660. Display 1660 may be a near-eye display, and may graphically present information, such as images, videos, and various instructions, from electronic system 1600 to a user. Such information may be derived from one or more applications 1622-1624, virtual reality engine 1626, one or more other hardware 1680, a combination thereof, or any other suitable means for resolving graphical content for the user (e.g., by operating system 1625). Display 1660 may use LCD technology, LED technology (including, for example, OLED, ILED, μ-LED, AMOLED, TOLED, etc.), light emitting polymer display (LPD) technology, or some other display technology.

Electronic system 1600 may include a user input/output 1670. User input/output 1670 may allow a user to send action requests to electronic system 1600. An action request may be a request to perform a particular action. For example, an action request may be to start or end an application or to perform a particular action within the application. User input/output 1670 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1600. In some embodiments, user input/output 1670 may provide haptic feedback to the user in accordance with instructions received from electronic system 1600. For example, the haptic feedback may be provided when an action request is received or has been performed.

Electronic system 1600 may include a camera 1650 that may be used to take photos or videos of a user, for example, for tracking the user's eye position. Camera 1650 may also be used to take photos or videos of the environment, for example, for VR, AR, or MR applications. Camera 1650 may include, for example, a complementary metal-oxide-semiconductor (CMOS) image sensor with a few millions or tens of millions of pixels. In some implementations, camera 1650 may include two or more cameras that may be used to capture 3-D images.

In some embodiments, electronic system 1600 may include a plurality of other hardware 1680. Each of other hardware 1680 may be a physical within electronic system 1600. While each of other hardware 1680 may be permanently configured as a structure, some of other hardware 1680 may be temporarily configured to perform specific functions or temporarily activated. Examples of other hardware 1680 may include, for example, an audio output and/or input (e.g., a microphone or speaker), a near field communication (NFC), a rechargeable battery, a battery management system, a wired/wireless battery charging system, etc. In some embodiments, one or more functions of other hardware 1680 may be implemented in software.

In some embodiments, memory 1620 of electronic system 1600 may also store a virtual reality engine 1626. Virtual reality engine 1626 may execute applications within electronic system 1600 and receive position information, acceleration information, velocity information, predicted future positions, or any combination thereof of the HMD device from the various sensors. In some embodiments, the information received by virtual reality engine 1626 may be used for producing a signal (e.g., display instructions) to display 1660. For example, if the received information indicates that the user has looked to the left, virtual reality engine 1626 may generate content for the HMD device that mirrors the user's movement in a virtual environment. Additionally, virtual reality engine 1626 may perform an action within an application in response to an action request received from user input/output 1670 and provide feedback to the user. The provided feedback may be visual, audible, or haptic feedback. In some implementations, processor(s) 1610 may include one or more GPUs that may execute virtual reality engine 1626.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, ABC, AAB, AABBCCC, etc.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A head-mounted display system comprising:
a light source configured to emit a light beam;
a scanner configured to steer the light beam;
a waveguide display configured to receive the light beam from the scanner and direct the light beam towards an eyebox of the head-mounted display system;
one or more processors electrically coupled to the light source and the scanner; and
one or more memory devices storing instructions that, when executed by the one or more processors, cause the one or more processors to perform operations including:
determining, based on content of an image, a vector scanning pattern for displaying the image, wherein the vector scanning pattern includes a plurality of scan lines and one or more transition lines connecting the plurality of scan lines, and wherein at least one transition line of the one or more transition lines includes a curved section;
generating control signals for controlling the scanner to steer the light beam according to the vector scanning pattern; and
generating modulation signals for modulating the light source such that the light beam is turned on when the scanner operates according to the plurality of scan lines and is turned off when the scanner operates according to the one or more transition lines.

2. The head-mounted display system of claim 1, wherein the one or more transition lines include a transition line that forms a loop to connect two scan lines of the plurality of scan lines.

3. The head-mounted display system of claim 1, wherein controlling the scanner to steer the light beam according to the vector scanning pattern comprises controlling the scanner to:
steer the light beam at a first velocity when the scanner operates according to a scan line of the plurality of scan lines; and
steer at a second velocity that is higher than the first velocity when the scanner operates according to a transition line of the one or more transition lines.

4. The head-mounted display system of claim 1, wherein controlling the scanner to steer the light beam according to the vector scanning pattern comprises controlling the scanner to steer the light beam at a variable velocity based on brightness information of the image when the scanner operates according to a scan line of the plurality of scan lines.

5. The head-mounted display system of claim 1, further comprising dynamic blur optics configured to dynamically change a beam width of the light beam emitted by the light source.

6. The head-mounted display system of claim 5, wherein the instructions further cause the one or more processors to control the dynamic blur optics based on the content of the image to dynamically change the beam width of the light beam emitted by the light source.

7. The head-mounted display system of claim 1, wherein:
the one or more memory devices further store brightness nonuniformity information of the waveguide display; and
the instructions further cause the one or more processors to compensate brightness nonuniformity of the waveguide display by performing at least one of:
generating, based on the brightness nonuniformity information of the waveguide display, control signals for varying a scanning velocity of the scanner; or
generating, based on the brightness nonuniformity information of the waveguide display, modulation signals for modulating an output power of the light source.

8. The head-mounted display system of claim 1, wherein the scanner includes a micro-mirror and an actuator for rotating the micro-mirror.

9. The head-mounted display system of claim 1, wherein the light source includes at least one of a laser that can be modulated or an optical modulator configured to modulate the light beam.

10. The head-mounted display system of claim 1, wherein the waveguide display includes:
a substrate transparent to visible light;
an input coupler configured to couple the light beam into the substrate such that the light beam is guided by the substrate; and
an output coupler configured to couple the light beam out of the substrate at one or more locations of the substrate.

11. The head-mounted display system of claim 1, further comprising an eye-tracking system.

12. The head-mounted display system of claim 11, wherein the instructions further cause the one or more processors to determine the content of the image based on outputs of the eye-tracking system.

13. A processor-implemented method comprising:
determining, based on content of an image to be displayed by a head-mounted display system, a vector scanning pattern for displaying the image, wherein the vector scanning pattern includes a plurality of scan lines and one or more transition lines connecting the plurality of scan lines, and wherein at least one transition line of the one or more transition lines includes a curved section;
generating control signals for controlling a scanner to steer, according to the vector scanning pattern, a light beam emitted by a light source towards a waveguide display of the head-mounted display system; and
generating modulation signals for modulating the light source such that the light beam is turned on when the scanner operates according to the plurality of scan lines and is turned off when the scanner operates according to the one or more transition lines.

14. The processor-implemented method of claim 13, wherein the one or more transition lines include a transition line that forms a loop to connect two scan lines of the plurality of scan lines.

15. The processor-implemented method of claim 13, wherein controlling the scanner to steer the light beam according to the vector scanning pattern comprises controlling the scanner to:
steer the light beam at a first velocity when the scanner operates according to a scan line of the plurality of scan lines; and
steer at a second velocity that is higher than the first velocity when the scanner operates according to a transition line of the one or more transition lines.

16. The processor-implemented method of claim 13, wherein controlling the scanner to steer the light beam according to the vector scanning pattern comprises controlling the scanner to steer the light beam at a variable velocity based on brightness information of the image when the scanner operates according to a scan line of the plurality of scan lines.

17. The processor-implemented method of claim 13, further comprising generating, based on the content of the image, control signals for controlling dynamic blur optics to dynamically change a beam width of the light beam.

18. The processor-implemented method of claim 13, further comprising:
   obtaining brightness nonuniformity information of the waveguide display;
   compensating brightness nonuniformity of the waveguide display by performing at least one of:
      generating, based on the brightness nonuniformity information of the waveguide display, control signals for varying a scanning velocity of the scanner; or
      generating, based on the brightness nonuniformity information of the waveguide display, modulation signals for modulating an output power of the light source.

19. The processor-implemented method of claim 13, wherein the vector scanning pattern includes a region that includes a raster scanning pattern.

20. The processor-implemented method of claim 13, wherein determining, based on the content of the image to be displayed by the head-mounted display system, the vector scanning pattern for displaying the image comprises:
   detecting edges of features in the image; and
   determining the vector scanning pattern based on the detected edges of the features in the image.

* * * * *